United States Patent
Eiding et al.

(10) Patent No.: US 12,426,143 B2
(45) Date of Patent: Sep. 23, 2025

(54) SYSTEM FOR CONTROLLING LOAD CONTROL PARAMETERS OVER FADE TIMES

(71) Applicant: Lutron Technology Company LLC, Coopersburg, PA (US)

(72) Inventors: Mark Eiding, Quakertown, PA (US); Mark Ryan Lopez, Lansdale, PA (US); David L. Wykes, Jr., Quakertown, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 177 days.

(21) Appl. No.: 18/121,283

(22) Filed: Mar. 14, 2023

(65) Prior Publication Data
US 2023/0225037 A1    Jul. 13, 2023

Related U.S. Application Data

(63) Continuation of application No. 17/547,020, filed on Dec. 9, 2021, now Pat. No. 11,696,385.

(60) Provisional application No. 63/123,357, filed on Dec. 9, 2020.

(51) Int. Cl.
H05B 47/19    (2020.01)
H05B 47/16    (2020.01)

(52) U.S. Cl.
CPC .............. *H05B 47/19* (2020.01); *H05B 47/16* (2020.01)

(58) Field of Classification Search
CPC ...... H05B 47/19; H05B 47/16; H05B 47/175; H05B 45/20; Y02B 20/40
See application file for complete search history.

(56) References Cited

U.S. PATENT DOCUMENTS

| 4,360,739 A | 11/1982 | Goldstein |
| 5,264,761 A | 11/1993 | Johnson |
| 7,369,060 B2 | 5/2008 | Veskovic et al. |

(Continued)

FOREIGN PATENT DOCUMENTS

| CN | 2596671 Y | 12/2003 |
| CN | 104969664 A | 10/2015 |

(Continued)

OTHER PUBLICATIONS

CN2596671Y, This was cited in related U.S. Appl. No. 16/875,663 dated May 15, 2020.

(Continued)

*Primary Examiner* — Renan Luque
(74) *Attorney, Agent, or Firm* — Flaster Greenberg P.C.

(57) ABSTRACT

A load controller in a load control system may communicate messages with load control devices for controlling electrical loads. The load controller may receive messages that comprise values for controlling different load control parameters over different overlapping fade times. The load controller may identify a shorter remaining fade time for controlling one of the load control parameters and may determine an updated target value for controlling another load control parameter over the shorter remaining fade time. The load controller may transmit a series of messages within a limited fade time using an updated target value for each message to control an electrical load at a fade rate that during a fade time that is longer than the limited fade time.

26 Claims, 14 Drawing Sheets

(56) References Cited

U.S. PATENT DOCUMENTS

| | | | |
|---|---|---|---|
| 7,391,297 B2 | 6/2008 | Cash et al. |
| 7,834,856 B2 | 11/2010 | Grinshpoon et al. |
| 8,009,042 B2 | 8/2011 | Steiner et al. |
| 8,330,638 B2 | 12/2012 | Altonen et al. |
| 8,451,116 B2 | 5/2013 | Steiner et al. |
| 8,471,779 B2 | 6/2013 | Mosebrook |
| 8,950,461 B2 | 2/2015 | Adams et al. |
| 9,115,537 B2 | 8/2015 | Blair |
| 9,208,965 B2 | 12/2015 | Busby et al. |
| 9,368,025 B2 | 6/2016 | Carmen |
| 9,418,802 B2 | 8/2016 | Romano et al. |
| 9,520,247 B1 | 12/2016 | Finnegan et al. |
| 9,583,288 B2 | 2/2017 | Jones et al. |
| 9,674,931 B1 | 6/2017 | Chen et al. |
| 9,799,469 B2 | 10/2017 | Bailey et al. |
| 9,959,997 B2 | 5/2018 | Bailey et al. |
| 10,027,127 B2 | 7/2018 | Crafts et al. |
| 10,271,407 B2 | 4/2019 | Pessina et al. |
| 10,420,194 B2 | 9/2019 | Mann et al. |
| 10,599,174 B2 | 3/2020 | Baker et al. |
| 10,834,802 B2 | 11/2020 | Knauss et al. |
| 11,425,811 B2 | 8/2022 | Petersen et al. |
| 2005/0146288 A1 | 7/2005 | Johnson et al. |
| 2008/0092075 A1 | 4/2008 | Jacob et al. |
| 2008/0111491 A1 | 5/2008 | Spira et al. |
| 2012/0292174 A1 | 11/2012 | Mah et al. |
| 2014/0169362 A1* | 6/2014 | Folkmanis ............ H04L 1/1867 370/351 |
| 2014/0265568 A1 | 9/2014 | Crafts et al. |
| 2014/0265880 A1 | 9/2014 | Taipale et al. |
| 2014/0265897 A1 | 9/2014 | Taipale et al. |
| 2015/0061539 A1 | 3/2015 | Hirayama et al. |
| 2015/0077021 A1 | 3/2015 | Mccarthy et al. |
| 2015/0371534 A1 | 12/2015 | Dimberg et al. |
| 2015/0373810 A1 | 12/2015 | Aliakseyeu et al. |
| 2016/0073479 A1 | 3/2016 | Erchak et al. |
| 2016/0095188 A1 | 3/2016 | Verberkt et al. |
| 2016/0381770 A1 | 12/2016 | Murakami |
| 2017/0105176 A1 | 4/2017 | Finnegan et al. |
| 2017/0223801 A1 | 8/2017 | Gan et al. |
| 2018/0063927 A1 | 3/2018 | Abraham et al. |
| 2018/0190451 A1 | 7/2018 | Scruggs |
| 2020/0128653 A1 | 4/2020 | Magielse et al. |
| 2020/0367346 A1 | 11/2020 | Petersen et al. |
| 2021/0029795 A1 | 1/2021 | Chaturvedi et al. |
| 2022/0342373 A1 | 10/2022 | Ho et al. |

FOREIGN PATENT DOCUMENTS

| | | | | |
|---|---|---|---|---|
| CN | 107950080 A | | 4/2018 | |
| EP | 2728972 A1 | * | 5/2014 | ......... H05B 33/0863 |
| EP | 2747525 A2 | | 6/2014 | |

OTHER PUBLICATIONS

CN104969664A, US2015373810A1.

CN107950080A, US10599174B2.

* cited by examiner

SYSTEM FOR CONTROLLING LOAD CONTROL PARAMETERS OVER FADE TIMES

CROSS-REFERENCE TO RELATED APPLICATIONS

This application is a continuation of U.S. Non-Provisional patent application Ser. No. 17/547,020, filed Dec. 9, 2021, which claims priority to U.S. Provisional Patent Application No. 63/123,357, filed Dec. 9, 2020, which is incorporated by reference herein in its entirety.

BACKGROUND

A user environment, such as a residence or an office building, for example, may be configured with a lighting control system. The lighting control system may be used to control the lighting loads providing artificial light in the user environment. Each load control system may include various control devices, including input devices and lighting control devices. The lighting control devices may receive messages from the input devices, which may include load control instructions, for controlling a corresponding electrical load. Examples of lighting control devices may include a dimmer switch, an electronic switch, a ballast, or a light-emitting diode (LED) driver. Examples of input devices may include remote control devices or sensors (e.g., occupancy sensors, daylight sensors, temperature sensors, and/or the like). Remote control devices may receive user input for performing lighting control. Sensor devices may detect sensor events for performing lighting control.

SUMMARY

A load controller in a load control system may communicate messages with load control devices for controlling electrical loads. The load controller receive messages that comprise values for controlling different load control parameters over different overlapping fade times. The load control devices with which the load controller is configured to communicate may be limited to controlling each load control parameter using a common fade time (e.g., a common fade time for all control parameters).

The load controller may receive commanded target values for controlling a first load control parameter and a second load control parameter over respective overlapping fade times. The load controller may identify a shorter remaining fade time for controlling the first load control parameter or the second load control parameter. The load controller may determine an updated target value for controlling the first load control parameter or the second load control parameter over the shorter remaining fade time and transmit the updated target value for controlling the first load control parameter or the second load control parameter over the shorter remaining fade time. The updated target value for controlling the first load control parameter or the second load control parameter may be used to simulate a continuous fade rate for controlling the first load control parameter or the second load control parameter toward the commanded target value for controlling the load control parameter over a commanded fade time.

The load control parameters may be lighting control parameters for controlling at least one lighting load. For example, the lighting control parameters may each comprise a different lighting control parameter selected from a group comprising a lighting intensity, a color temperature, and a color spectrum value (e.g., a color vibrancy level and/or color saturation level). The load control parameters may include an intensity (e.g., a volume) of a speaker or another audio device, a temperature, and/or a position of a covering that covers a motorized window treatment (e.g., a shade position)

The load control devices with which the load controller is configured to communicate may be limited to controlling a load control parameter over a limited fade time. The load controller may receive a commanded target value of a load control parameter for controlling the electrical load and a fade time over which the load control parameter is to be controlled. The load controller may compare the fade time to the limited fade time to determine whether the received fade time is longer than the limited fade time. If the fade time is longer than the limited fade time, the load controller may determine an updated target value for controlling the load control parameter over the limited fade time. The updated target value may be used to control the electrical load at a fade rate over the limited fade time to simulate the fade rate for controlling the electrical load toward the commanded target value over the entire received fade time. For example, the updated target value may be transmitted to the load control device for controlling the electrical load at the fade rate over the limited fade time.

The load controller may wait a transmission period and determine whether a remaining fade time after the transmission period is longer than the limited fade time. If the remaining fade time is longer than the limited fade time, the load controller may determine another updated target value for controlling the load control parameter over the limited fade time and transmit the updated target value to the load control device. If the remaining fade time is shorter than the limited fade time, the load controller may transmit the commanded target value of the load control parameter for controlling the electrical load to the load control device.

The load controller may receive commands to control two or more load control parameters over different amounts of time. For example, the load controller may receive a command to control a first load control parameter to a first target value over a first amount of time and a second load control parameter to a second target value over a second amount of time that is shorter than the first amount of time. The load controller may transmit instructions configured to maintain a current value of the first load control parameter while the second load control parameter is being controlled. Once the second load control parameter has been controlled to the second target value, the load controller may transmit instructions configured to control the first load control parameter to the first target value.

DETAILED DESCRIPTION

Figure 1:
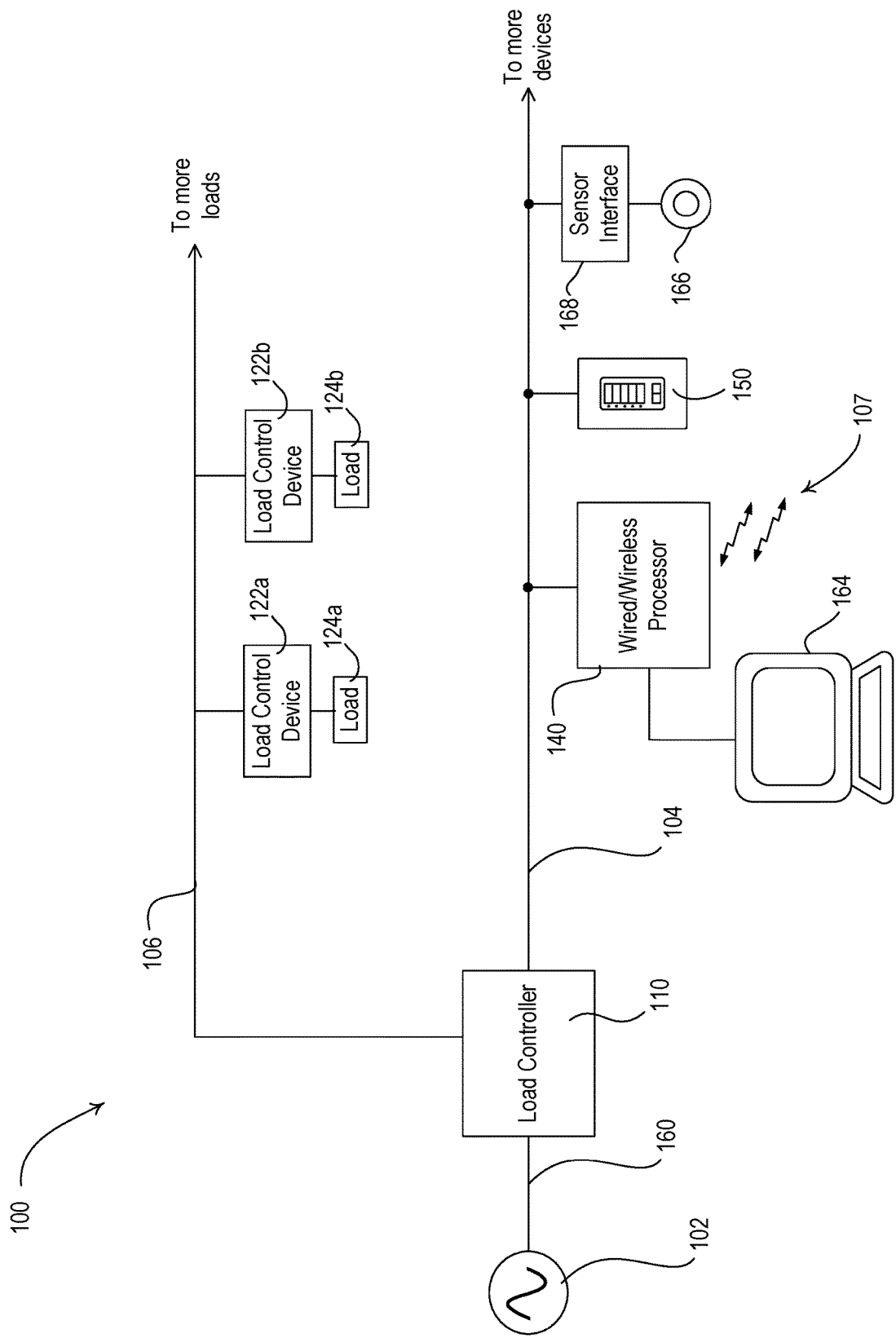
FIG. 1 is a diagram of an example load control system.

FIG. 1 is a diagram of an example load control system 100 for controlling the amount of power delivered from a power source 102 to one or more electrical loads. The power source 102 may be an alternating-current (AC) or direct current (DC) power source. The load control system 100 may comprise a number of control devices for controlling electrical loads. The control devices may comprise input devices and/or load control devices for controlling electrical loads. The input devices may be operable to transmit messages in response to user inputs, sensor inputs, or other input information and transmit messages for enabling load control. The control devices may include load control devices that may be operable to receive messages and/or control respective electrical loads in response to the received messages form input devices or other devices in the load control system 100. Though described as being transmitted in a message or a command, one or more messages or commands may be used to convey the information of the message or the command.

The control devices of the load control system 100 may comprise one or more input devices, e.g., such as a remote control device (e.g., a wired keypad device) 150 and/or a wired sensor 166, for transmitting messages on a wired communication link 104 for controlling one or more electrical loads. The remote control device 150 may be configured to transmit messages via a wired communication link 104 in response to an actuation of one or more buttons of the remote control device 150. The messages may include an indication of the button pressed on the remote control device 150. The remote control device 150 may be adapted to be wall-mounted in a standard electrical wallbox.

The wired sensor 166 may be configured to perform measurements and transmit messages on the wired communication link 104 in response to the measurements. For example, the wired sensor 166 may be a wired daylight sensor configured to measure (e.g., periodically measure) a signal (e.g., a photosensor or photodiode current) that may be used to determine a value indicative of a light intensity in the space in which the wired daylight sensor 166 is installed (e.g., sensor data). The wired sensor 166 may be an occupancy sensor configured to transmit messages on the wired communication link 104 in response to sensing an occupancy and/or vacancy condition for controlling an electrical load in the load control system 100. The wired sensor 166 may transmit messages that include occupancy conditions or a vacancy conditions identified by the wired sensor 166. The wired sensor 166 may be a color temperature sensor configured to measure (e.g., periodically measure) a signal that may be used to determine a value indicative of a color temperature in the space in which the wired daylight sensor 166 is installed (e.g., sensor data).

The wired sensor 166 may be configured to be coupled with a sensor interface 168. The wired sensor 166 may transmit messages (e.g., which may include a respectively measured signal) to the sensor interface 168 periodically in response to periodic measurements. The sensor interface 168 may be configured to transmit a message via the wired communication link 104 in response to a message received from the wired sensor 166. For example, the sensor interface 168 may be configured to convert the signal measured by the wired sensor 166 into an appropriate value that indicates the measurements taken in the space (e.g., a daylight value, such as foot-candles or another daylight value, a color temperature value, an intensity level, etc.) and may further transmit the value via the wired communication link 104. For example, the value may be used for controlling the intensities of one or more of the electrical loads in the load control system.

The load control system 100 may comprise a wired/wireless processor 140 configured to receive messages from input devices via the wired communication link 104 and/or transmit commands for controlling one or more electrical loads. For example, the wired/wireless processor 140 may receive messages from one or more input devices on the wired communication link 104 and transmit messages for controlling electrical loads in response to the messages received from the input devices. For example, the wired/wireless processor 140 may have stored thereon an association of input devices to load control devices for transmitting messages to the load control devices for enabling load control in response to messages received from the input devices. The wired/wireless processor 140 may store a zone identifier for the associated devices programmed in the same zone for enabling control of zones of load control devices in response to messages received from input devices in the same zone. For example, the wired/wireless processor may transmit the zone identifier in messages on the wired communication link 104 for controlling load control devices in the zone.

The wired/wireless processor 140 may be capable of communicating on the wired communication link 104 and/or a wireless communication link via RF signals 107. The wired/wireless processor 140 may receive messages from input devices and/or a network computing device 164 via a wired communication link and/or the RF signals 107.

The operation of the load control system 100 may be programmed and/or configured at one or more devices using a network computing device, such as the personal computing device 164 or other computing device, such as a mobile user device for example. The personal computing device 164 may execute a graphical user interface (GUI) configuration software for allowing a user to program how the load control system 100 may operate. The configuration software may generate a dataset that defines the operation of the load control system 100. For example, the dataset may include information regarding the operational settings (e.g., load control parameters) of different load control devices of the load control system 100. The dataset may include the load control parameters for controlling different types of load control devices and/or electrical loads. For example, the load control parameters may include lighting control parameters for controlling lighting loads in the load control system 100. In another example, the load control parameters may include control parameters for controlling other types of load control devices in the load control system 100, for example a speaker. The dataset may include association information regarding associations of the unique identifier of load control devices and the input devices (e.g., the remote control device 150 and/or the sensor 166) capable of performing control of the associated load control devices. The dataset may include zone configuration information comprising zone identifiers for identifying zones of load control devices and input devices programmed for enabling load control in the zone. For example, load control devices may be configured via the configuration software as being in the same zone as input devices for common control.

The dataset, or portions thereof, may be transmitted to one or more load controllers 110, wired/wireless processors 140, and/or control devices (e.g., load control devices and/or input devices) via wired and/or wireless communication links for being stored thereon. For example, the dataset may be transmitted to other devices on the wired communication link 104 or the wireless communication link comprising the RF signals 107. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The load control system 100 may comprise a load controller 110 configured to receive messages from input devices and/or the wired/wireless processor 140 on the wired communication link 104 and performing control of one or more electrical loads in response to such messages. The load controller 110 may be capable of receiving power from the AC power source 102 via a power line 160 and providing power to the one or more electrical loads with which it is electrically connected. The load controller 110 may be connected to the electrical loads via one or more wired communication links 106. The wired communication link 106 may include a wired power/communication link for providing power to and/or controlling one or more electrical loads on the wired communication link 106. In an example, the wired communication link 106 may be a digital addressable lighting interface (DALI) wired communication link or another wired link capable of providing communication with one or more load control devices for controlling corresponding electrical loads. In some examples, the wired communication link 106 may be configured to supply power to the load control devices 122a, 122b. Though shown as a wired link, the wired communication link 106 may comprise a wireless communication link on which messages are transmitted for controlling electrical loads.

The wired communication link 106 may include one or more addressable load control devices 122a, 122b for controlling corresponding electrical loads 124a, 124b. Though shown as a single wired communication link 106 with multiple load control devices 122a, 122b, the load control system 100 may comprise other wired communication links including one or more addressable load control devices 122a, 122b. The load control devices 122a, 122b and/or the electrical loads 124a, 124b may be supplied power from the load controller 110 on the wired communication link 106.

The load control devices 122a, 122b may be lighting control devices that may comprise, for example, a ballast, or a light-emitting diode (LED) driver. The electrical loads 124a, 124b may be lighting loads that may comprise fluorescent lamps or LED light sources (e.g., emitters) for being controlled by the respective lighting control devices. The lighting control devices may each control lighting control parameters of the corresponding electrical loads. The lighting control parameters may comprise a lighting intensity level, a color level, a color spectrum value (e.g., a color vibrancy level and/or color saturation level), and/or a fade rate. For example, the color level may be a color temperature level, such as a correlated color temperature (CCT) level, the color level may be x- and y-chromacity values, RGB values, RGBWAF values, and/or the like. The lighting intensity level, a color (e.g., color temperature) level, and/or a color vibrancy level may be controlled according to the fade rate over a period of time (e.g., fade time). Though lighting control devices and lighting loads are provided as examples of load control devices and electrical loads, respectively, which may be controlled according to lighting control parameters, other types of load control devices and electrical loads may be similarly controlled according to other load control parameters as described herein.

The load control parameters may be controlled at the load control devices 122a, 122b in response to the values of the load control parameters. For example, with regard to controlling lighting control parameters, the lighting intensity may be controlled in response to a relative lighting intensity value (e.g., between zero and one-hundred percent) for controlling the lighting load. The color may be controlled in response to x,y coordinates on a color spectrum. The color temperature may be controlled in response to color temperature values in a range of available color temperature values (e.g., 3000K to 5000K) for the corresponding electrical load. The color spectrum value may be controlled by a vibrancy level. In response to changes in the vibrancy level, the lighting control devices may adjust the wavelength (e.g., the color spectrum) of the light emitted by the lighting load, which may affect the color of the light (e.g., the reflected light) on objects. Increases and/or decreases in vibrancy level may increase/decrease saturation of the color of objects in the area without changing the color of the light when the user looks at the light (e.g., the color of the emitted light). In an example, the vibrancy level may indicate a relative level of vibrancy (e.g., between zero and one-hundred percent) for increasing/decreasing the vibrancy of the one or more lighting loads for a defined zone. Changing the relative level of vibrancy may increase or decrease the intensity of one or more white LEDs that make up the lighting load, thereby increasing or decreasing vibrancy, respectively. Changing vibrancy in this manner may also include changing the intensities of other LEDs (e.g., red, green, and/or blue LEDs) of the lighting load to maintain the same color output of the lighting loads (e.g., to maintain the same (or approximately the same) chromaticity coordinates of the mixed color output of the lighting load). The effect that controlling vibrancy has on the light emitted by the lighting load (e.g., the CRI value of the light emitted by the lighting load) may be based on the distance between the selected color setting and the black-body curve (e.g., or another predefined range of values, such as the color output of a white or substantially white LED within a respective lighting load). In an example, the load control parameters may include an intensity (e.g., a volume) of a speaker or another audio device. Additionally and/or alternatively, the load control parameters may include a temperature and/or a position of a covering that covers a motorized window treatment (e.g., a shade position).

The wired/wireless processor 140 may receive messages from input devices and identify the load control devices 122a, 122b that are to be controlled in response to the received messages. For example, the input devices may be stored in the same zone or have a unique identifier associated with the unique identifier of the load control devices 122a, 122b in memory. The wired/wireless processor 140 may receive the messages from the input devices and identify associated load control devices 122a, 122b and load control instructions for controlling the electrical loads 124a, 124b in response to the messages from the input devices. The wired/wireless processor 140 may generate messages comprising load control parameters for controlling the load control devices 122a, 122b in response to the messages received from input devices. For example, the wired/wireless processor 140 may generate lighting control instructions for controlling lighting parameters of lighting loads. The wired/wireless processor 140 may also independently generate messages comprising load control parameters for controlling load control devices 122a, 122b. For example, the wired/wireless processor 140 may generate messages comprising load control parameters in response to timer events or another expiration of time. While the wired/wireless processor 140 may generate messages comprising load control parameters for controlling the load control devices 122a, 122b, the messages comprising the load control parameters may be transmitted directly from the input devices.

The load controller 110 may receive these messages from the wired/wireless processor 140, or may receive the messages directly from the input devices, e.g., the network computing device 164, the remote control device 150, the wired sensor 166, and/or the like via the wired communication link 104. The messages received by the load controller 110 may include the unique identifier of the input device from which the message is received and/or the zone identifier for identifying the associated load control devices 122a, 122b for being controlled. The messages may include load control parameters for controlling corresponding electrical loads 124a, 124b. For example, the messages may include lighting control parameters (e.g., intensity, color, and/or color spectrum value) for controlling a lighting load over a fade time (e.g., a period of time over which the load control parameter is controlled). The fade time may be a load control parameter over which other load control parameters may be controlled. Though the load controller 110 may be described as receiving load control parameters via messages on the wired communication link 104, the load controller 110 may receive the messages from the input devices or the wired/wireless processor 140 and independently generate the load control parameters for controlling the electrical loads 124a, 124b.

The load controller 110 may receive messages configured to control the load control parameters at the load control devices 122a, 122b and communicate messages, via the wired communication link 106, to the load control devices 112a, 122b for controlling the electrical loads 124a, 124b according to the values of the load control parameters. In an example, the load controller 110 may receive messages configured to control multiple lighting control parameters (e.g., intensity, color, and/or color spectrum value) over a fade time and transmit one or more messages, via the wired communication link 106, comprising the lighting control parameters and the fade time to control the lighting loads over the fade time. The load control devices 122a and 122b may be configured to control the respective loads 124a and 124b in response to the load control parameters and the respective fade time.

The load control devices 122a, 122b may be restricted to controlling the load control parameters over a limited fade time $T_{FADE\_LIMIT}$. For example, the limited fade time $T_{FADE\_LIMIT}$ may be a maximum period of time supported for adjusting a load control parameter at the load control devices 122a, 122b at a fade rate in response to a single message transmission on the wired communication link 106 and/or a maximum period of time the load controller 110 is preconfigured to transmit as a fade time for a load control parameter. When a commanded fade time $T_{FADE\_CMD}$ for controlling the electrical loads 124a, 124b is longer than the limited fade time $T_{FADE\_LIMIT}$, the load controller 110 may transmit multiple messages over the period of the commanded fade time $T_{FADE\_CMD}$ and simulate or achieve the same fade rate at which the electrical loads 124a, 124b would be controlled over the commanded fade time $T_{FADE\_CMD}$.

The load control devices 122a, 122b may also, or alternatively, be limited to controlling one or more load control parameters over a common fade time (e.g., a common fade time for all load control parameters at a single time). For example, the load control devices 122a, 122b may receive a first message on the wired communication link 106 that comprises a first load control parameter for being controlled over a first fade time (e.g., at a first fade rate), and then subsequently receive a second message on the wired communication link 106 that comprises a second load control parameter for being controlled over a second fade time (e.g., at a second fade rate). The load control devices 122a and 122b may begin to control the first load control parameter at the first fade rate, but be unable to continue to control the first load control parameter at the first fade rate while also controlling the second parameter at the second fade rate. The first and second load control parameters may be of the same type (e.g., lighting control parameters) or different types (e.g., one may be a lighting control parameter and one may be a volume control parameter). Additionally and/or alternatively, the load control parameters may include a temperature and/or a position of a covering that covers a motorized window treatment (e.g., a shade position).

In a more specific example, the load control devices 122a, 122b may receive a color temperature value and a color temperature fade time for controlling the color temperature of the corresponding electrical loads 124a, 124b over the color temperature fade time (e.g., at a color temperature fade rate). The load control devices 122a, 122b may subsequently receive a lighting intensity value and a lighting intensity fade time for controlling the lighting intensity of the corresponding electrical loads 124a, 124b over the lighting intensity fade time (e.g., at a lighting intensity fade rate). The load control devices 122a, 122b may be unable to continue to control the color temperature value of the corresponding electrical loads 124a, 124b at the color temperature fade rate during the color temperature fade time, while also controlling the lighting intensity of the corresponding electrical loads 124a, 124b at the lighting intensity fade rate. As described herein, the load controller 110 may determine updated target load control parameters that may be transmitted to the load control devices 122a, 122b to allow the load control devices 122a, 122b to control the multiple load control parameters over multiple fade times, while maintaining a respective fade rate (e.g., the color temperature fade rate and the lighting intensity fade rate) for each load control parameter.

Figure 2A:
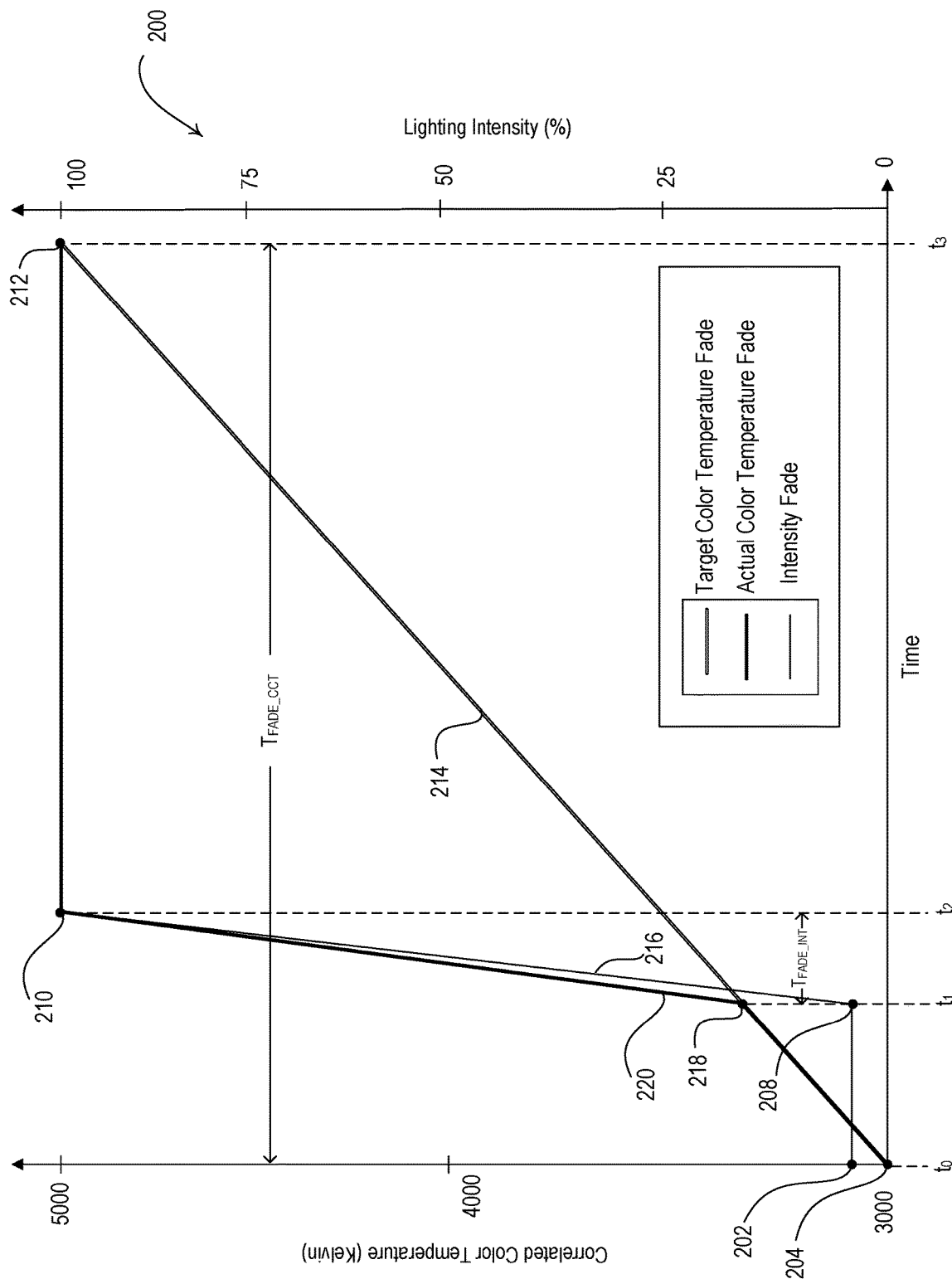
FIGS. 2A-2C are example diagrams for controlling load control parameters according to different fade rates.
Figure 2B:
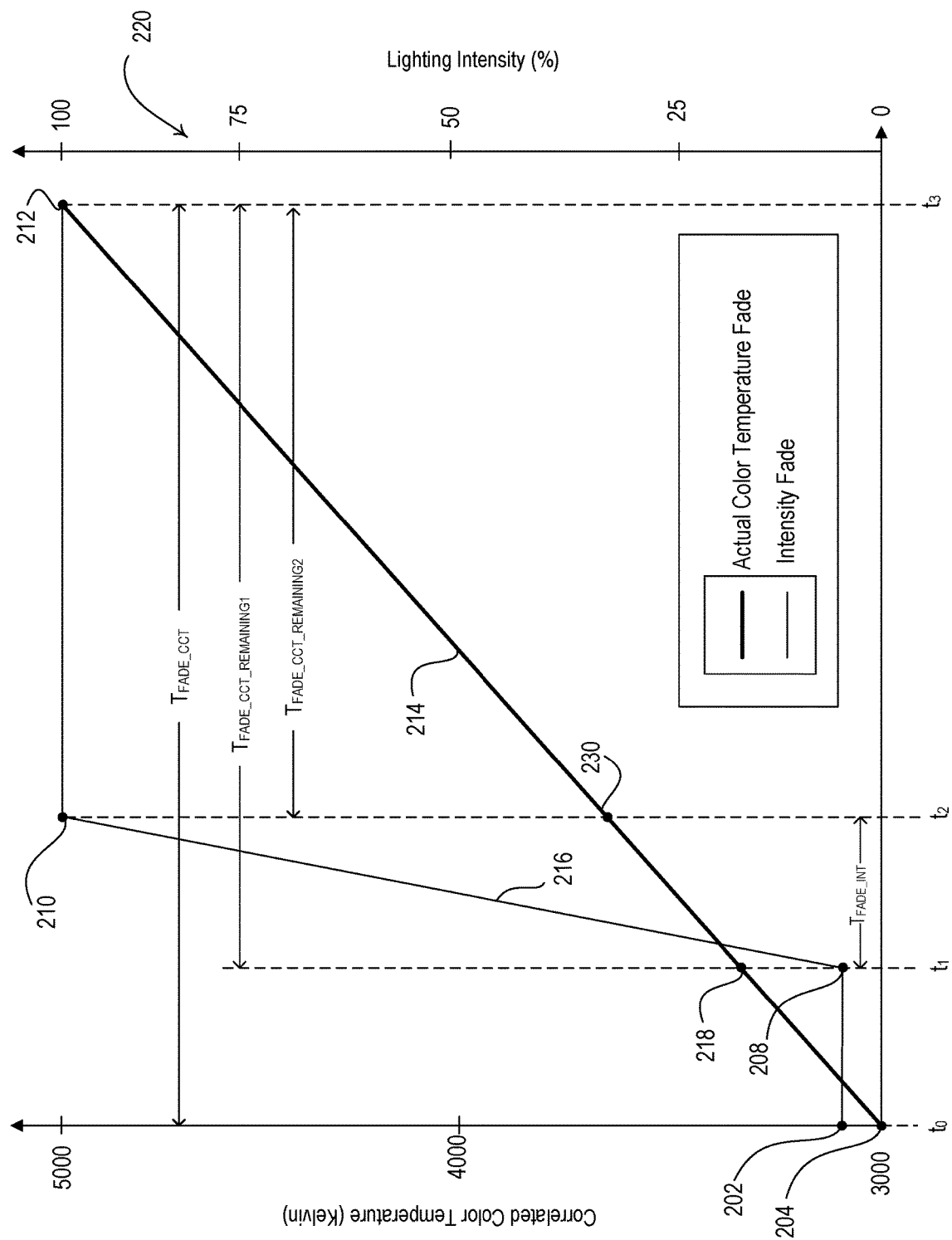
Figure 2C:
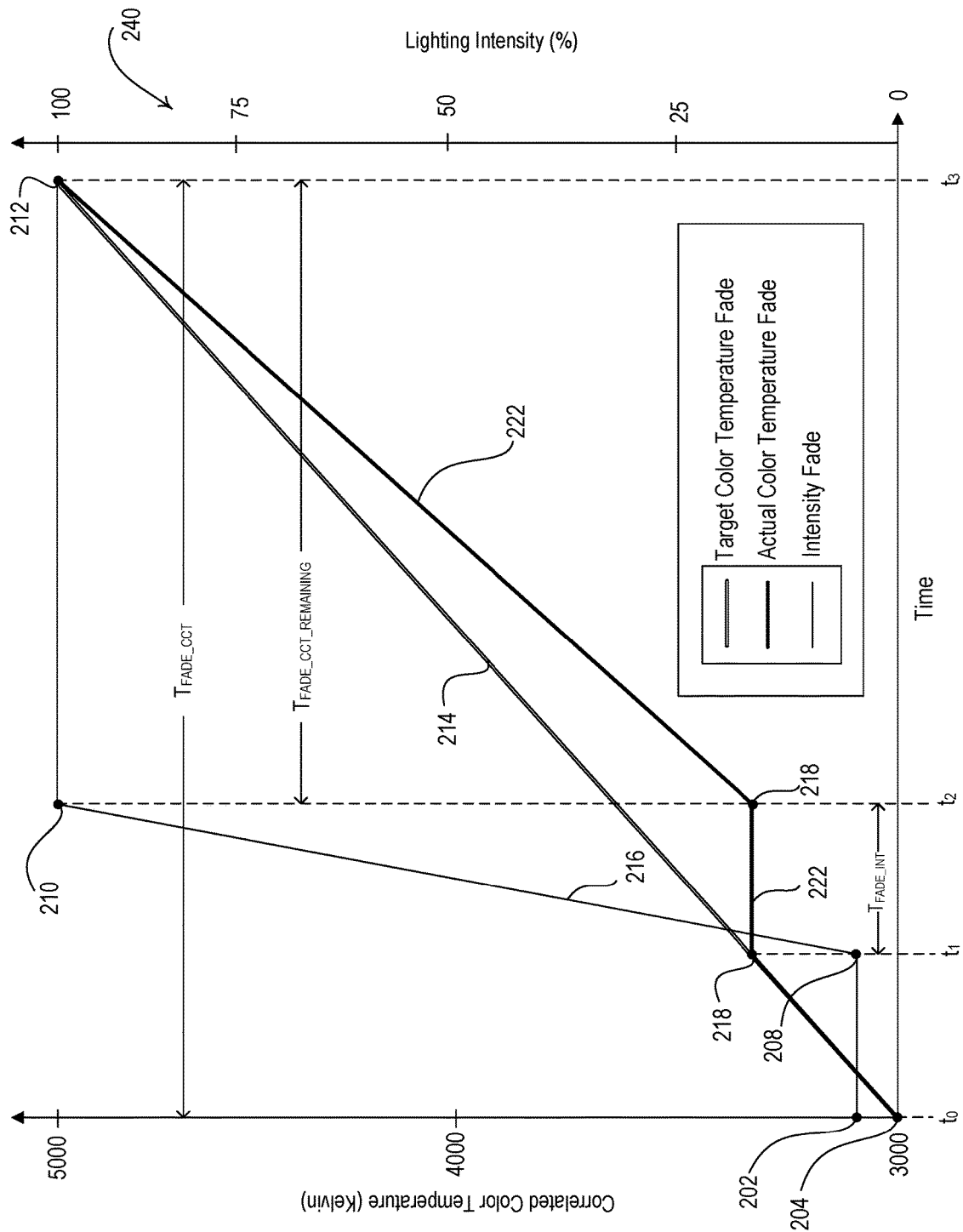

FIGS. 2A-2C illustrate example diagrams 200, 220, and 240, respectively, showing values of different load control parameters over time (e.g., at different fade rates). For example, the diagrams 200, 220, 240 depict the values of a first load control parameter (e.g., color and/or color temperature) and a second load control parameter (e.g., intensity) over time. A load controller (e.g., the load controller 110 of FIG. 1) may be configured to transmit messages comprising the load control parameters and/or a respective fade time of the load control parameters. A load control device (e.g., the load control devices 122a, 122b of FIG. 1) may receive the messages and control the corresponding electrical load according to the messages. The load control device may be configured to control the electrical load in response to the messages received from the load controller. For example, the load control device may be a lighting control device configured to control a lighting load in response to lighting control parameters received from the load controller. The first lighting control parameter may comprise a color temperature value or other color value configured to control the color temperature or color of the lighting load. The second lighting control parameter may comprise a lighting intensity value configured to control the lighting intensity of the lighting load. Though first and second lighting control parameters in the example diagrams 200, 220, and 240 may be used as an example for describing how load control parameters may be controlled over different fade times, any one or more load control parameters may be similarly controlled as described herein.

As shown in FIG. 2A, the lighting intensity of the lighting load may be set to a first intensity value 202 (e.g., about five percent intensity) and the color temperature of the lighting load may be set to a first color temperature value 204 (e.g., about 3000K) at an initial time $t_0$. The load controller may transmit to the lighting control device a first message that is configured to control the color temperature of the lighting load to a second (e.g., target) color temperature value 212 (e.g., about 5000K) over a color temperature fade time $T_{FADE\_CCT}$ (e.g., about 90 seconds), such that the color temperature of the lighting load may reach the second (e.g., target) color temperature value 212 at time $t_3$. For example, the first message may comprise the second (e.g., target) color temperature value 212 and the color temperature fade time $T_{FADE\_CCT}$ as load control parameters. The lighting control device may begin controlling the color temperature (e.g., starting at the initial time to) at a color temperature fade rate, for example, along a target color temperature fade curve 214 (e.g., based on the received load control parameters). For example, the color temperature fade rate may be the ratio between the second target color temperature value 212 and the color temperature fade time $T_{FADE\_CCT}$. Between times $t_0$ and $t_1$, the values of an actual color temperature fade curve 220 may be equal to the values of the target color temperature fade curve 214.

At time $t_1$, the load controller may transmit a second message that is received by the lighting control device and is configured to control the lighting intensity of the lighting load. The second message may include a second (e.g., target) lighting intensity value 210 (e.g., about 100 percent) to which to control the lighting load over a lighting intensity fade time $T_{FADE\_INT}$ (e.g., about 10 seconds). For example, the second message received by the lighting control device from the load controller may comprise the second (e.g., target) lighting intensity value 210 and the lighting intensity fade time $T_{FADE\_INT}$ as load control parameters. The lighting control device may begin controlling the lighting intensity (e.g., starting at time $t_1$) at a lighting intensity fade rate, for example, along a lighting intensity fade curve 216 (e.g., based on the received load control parameters). For example, the lighting intensity fade rate may be the ratio between the second (e.g., target) lighting intensity value 210 and the lighting intensity fade time $T_{FADE\_INT}$.

As the lighting control device may be limited to controlling the lighting control parameters (e.g., the lighting intensity and the color temperature) over a common fade time (e.g., a common fade time for all control parameters at the same time), the lighting control device may be unable to continue to control the color temperature of the lighting load at the color temperature fade rate after receiving the second message including the lighting intensity fade time $T_{FADE\_INT}$ at time $t_1$. As shown in FIG. 2A, at time $t_1$, the lighting control device may be configured to begin controlling each of the lighting control parameters (e.g., the lighting intensity and the color temperature) using the most recently received fade time, i.e., the lighting intensity fade time $T_{FADE\_INT}$. So, as shown in FIG. 2A, the values of the actual color temperature curve 220 of the lighting load may deviate from the values of the target color temperature curve 214 in response to the receipt of the second message including the lighting intensity fade time $T_{FADE\_INT}$. For example, at time $t_1$, the lighting control device may begin to control the color temperature of the lighting load to the second (e.g., target) color temperature value 212 over the lighting intensity fade time $T_{FADE\_INT}$. The color temperature may be controlled from an intermediate color temperature value 218 at time $t_1$ to the second (e.g., target) color temperature value 212 (e.g., to which the color temperature was previously being controlled) at time $t_2$ along the actual color temperature fade curve 220 over the more recently received intervening fade time (e.g., the lighting intensity fade time $T_{FADE\_INT}$).

FIG. 2B shows another example diagram 220 showing fade curves for different load control parameters over time. Similar to the diagram 200 shown in FIG. 2A, the lighting intensity of the lighting load may be set to a first intensity value 202 (e.g., about five percent intensity) and the color temperature of the lighting load may be set to a first color temperature value 204 (e.g., about 3000K) at an initial time to. The load controller may transmit to the lighting control device a first message that is configured to control the color temperature of the lighting load to a second (e.g., target) color temperature value 212 (e.g., about 5000K) over a color temperature fade time $T_{FADE\_CCT}$ (e.g., about 90 seconds) at a color temperature fade rate, such that the color temperature of the lighting load may reach the second (e.g., target) color temperature value 212 at time $t_3$, for example, along a target color temperature fade curve 214. Again, the lighting control device may receive a message that includes a second (e.g., target) lighting intensity value 210 and a lighting intensity fade time $T_{FADE\_INT}$ at $t_1$. For example, at $t_1$ there may be a remaining color temperature fade time $T_{FADE\_CCT\_REMAINING1}$. The remaining color temperature fade time $T_{FADE\_CCT\_REMAINING1}$ may be the time remaining from the color temperature fade time $T_{FADE\_CCT}$ at the time $t_1$. However, as the lighting control device may be limited to controlling each of the lighting control parameters using a common fade time for all control parameters, the message from the load controller may include an updated target color temperature value 230 over which the color temperature is to also be controlled over the lighting intensity fade time $T_{FADE\_INT}$. The lighting control device may begin changing the lighting intensity at time $t_1$ from the lighting intensity value 208 to the second (e.g., target) lighting intensity value 210 over the lighting intensity fade time $T_{FADE\_INT}$ at a lighting intensity fade rate, for example, along a lighting intensity fade curve 216. At the same time, the lighting control device may begin changing, or continue changing, the color temperature of the lighting load at time $t_1$ from the color temperature value 218 to the updated target color temperature value 230 over the lighting intensity fade time $T_{FADE\_INT}$. The updated target color temperature value 230 may be calculated at the load controller and transmitted to the lighting control device to maintain a color temperature fade rate, for example, along the target color temperature fade curve 214.

The lighting control device may receive a message from the load controller to continue to control the color temperature of the lighting control device toward the second (e.g., target) color temperature value 212 over a remaining color temperature fade time $T_{FADE\_CCT\_REMAINING2}$ from the time $t_2$ to the time $t_3$. The remaining color temperature fade time $T_{FADE\_CCT\_REMAINING2}$ may be the time remaining from the color temperature fade time $T_{FADE\_CCT}$ at the time $t_2$. As can be seen from the diagram 220 in FIG. 2B, controlling the color temperature from the color temperature value 218 to the updated target color temperature value 230 over the duration of the lighting intensity fade time $T_{FADE\_INT}$ may allow the target color temperature fade curve 214 of the color temperature value to maintain the color temperature fade rate along the target color temperature fade curve 214 over the entire color temperature fade time $T_{FADE\_CCT}$.

FIG. 2C shows another example diagram 240 showing fade rates for different load control parameters over time. Similar to the diagrams 200, 220 shown in FIGS. 2A, 2B, the lighting control device may initially be set at an intensity value 202 and color temperature value 204 at time to. At time to, the lighting control device may receive a message to control the color temperature to a second (e.g., target) color temperature value 212 over a color temperature fade time $T_{FADE\_CCT}$, causing the color temperature to initially change at a color temperature fade rate, for example, along a target color temperature fade curve 214. Between times to and $t_1$, the values of an actual color temperature fade curve 222 may be equal to the values of the target color temperature fade curve 214. The lighting control device may receive, at time $t_1$, a message that includes a second (e.g., target) lighting intensity value 210 and a lighting intensity fade time $T_{FADE\_INT}$, and begin changing the lighting intensity from the lighting intensity value 208 at time $t_1$ to the second (e.g., target) lighting intensity value 210 at time $t_2$ using a lighting intensity fade rate, for example, along a lighting intensity fade curve 216. The color temperature value may be equal to a color temperature value 218 at time $t_1$. As the lighting control device may be limited to controlling each of the lighting control parameters using a common fade time for all control parameters, the lighting control device may maintain the same color temperature value constant while the lighting control device is adjusting the lighting intensity value over the lighting intensity fade time $T_{FADE\_INT}$ from time $t_1$ to time $t_2$. The load controller may transmit a message to the lighting control device to control the lighting intensity over the lighting intensity fade time $T_{FADE\_INT}$ from time $t_1$ to time $t_2$, the lighting control device may control the color temperature value along the actual color temperature fade curve 222 to maintain the color temperature value constant at the current color temperature value 218. After the lighting intensity fade time $T_{FADE\_INT}$ has ended at time $t_2$, the lighting control device may then control the color temperature value over the remaining color temperature fade time $T_{FADE\_CCT\_REMAINING}$ from the time $t_2$ to the time $t_3$. For example, the load controller may transmit another message to the lighting control device at time $t_2$ to control the color temperature value over the remaining color temperature fade time $T_{FADE\_CCT\_REMAINING}$ toward the second (e.g., target) color temperature value 212, which may result in the color temperature being controlled at the lighting control device along the actual color temperature fade curve 222 at an adjusted color temperature fade rate.

As can be seen from the diagram 240 in FIG. 2C, instructing the load control device to maintain its color temperature value (e.g., not change) for the duration of the intervening lighting intensity fade time $T_{FADE\_INT}$ may allow the fade rate 219 of the color temperature value to approximate (e.g., simulate) the target color temperature fade curve 214 to achieve the second (e.g., target) color temperature value 212 over the color temperature fade time $T_{FADE\_CCT}$. The adjusted color temperature fade rate along the actual color temperature fade curve 222 between time $t_2$ and time $t_3$, however, is different than the color temperature fade rate along the target color temperature fade curve 214. The actual color temperature curve 222 shown in FIG. 2B may approximate (e.g., simulates) the target color temperature curve 214. Controlling the lighting load to remain constant at the color temperature value 218 while the lighting intensity value is adjusted over the lighting intensity fade time $T_{FADE\_INT}$ instead of calculating an updated color temperature value to which to control the color temperature over the lighting intensity fade time $T_{FADE\_INT}$ may simplify the calculations performed at the load controller and/or the message received by the load control device.

Figure 3A:
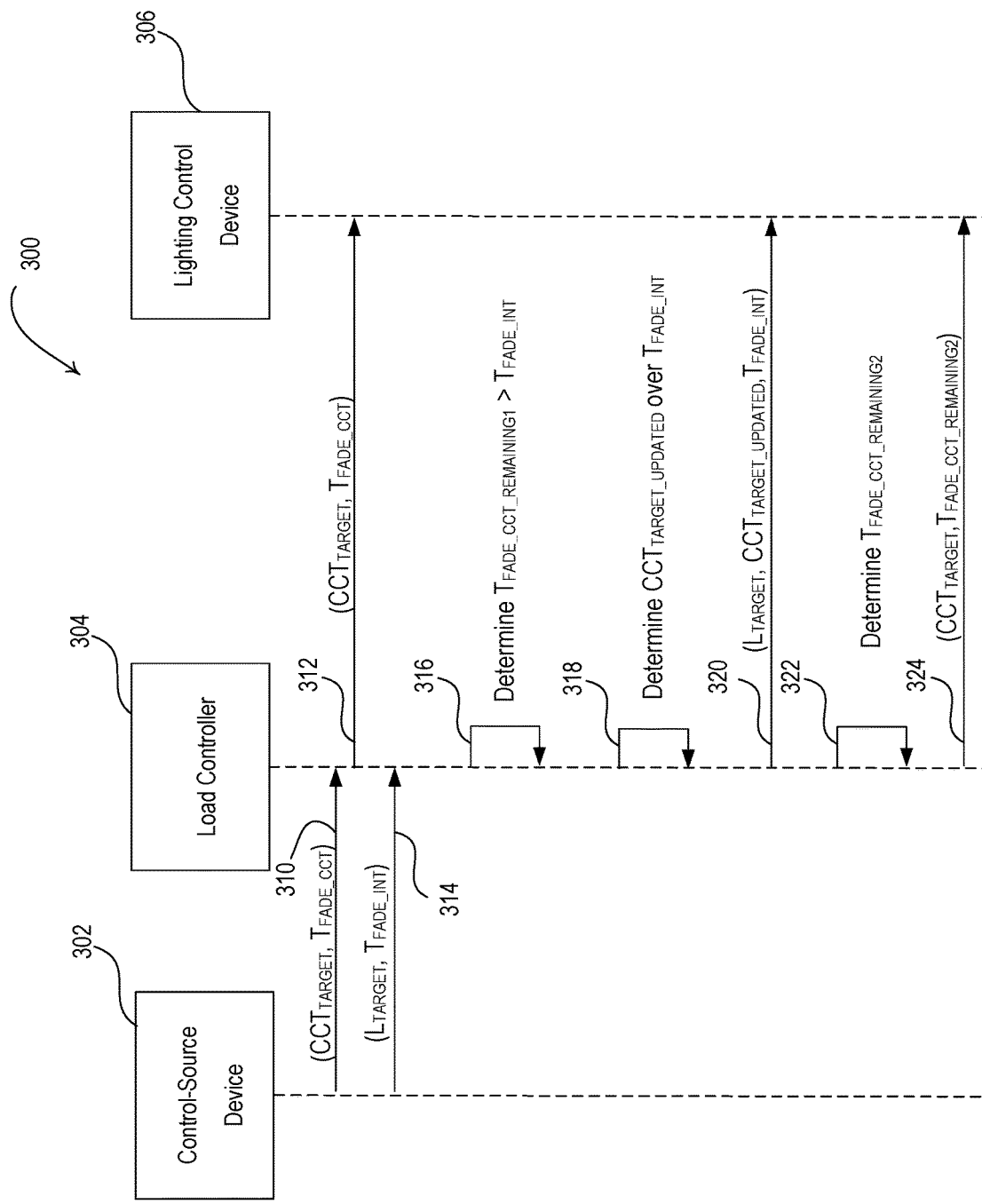
FIGS. 3A-3B are example sequence diagrams illustrating the operation of a load control system for controlling load control parameters over multiple fade times.
Figure 3B:
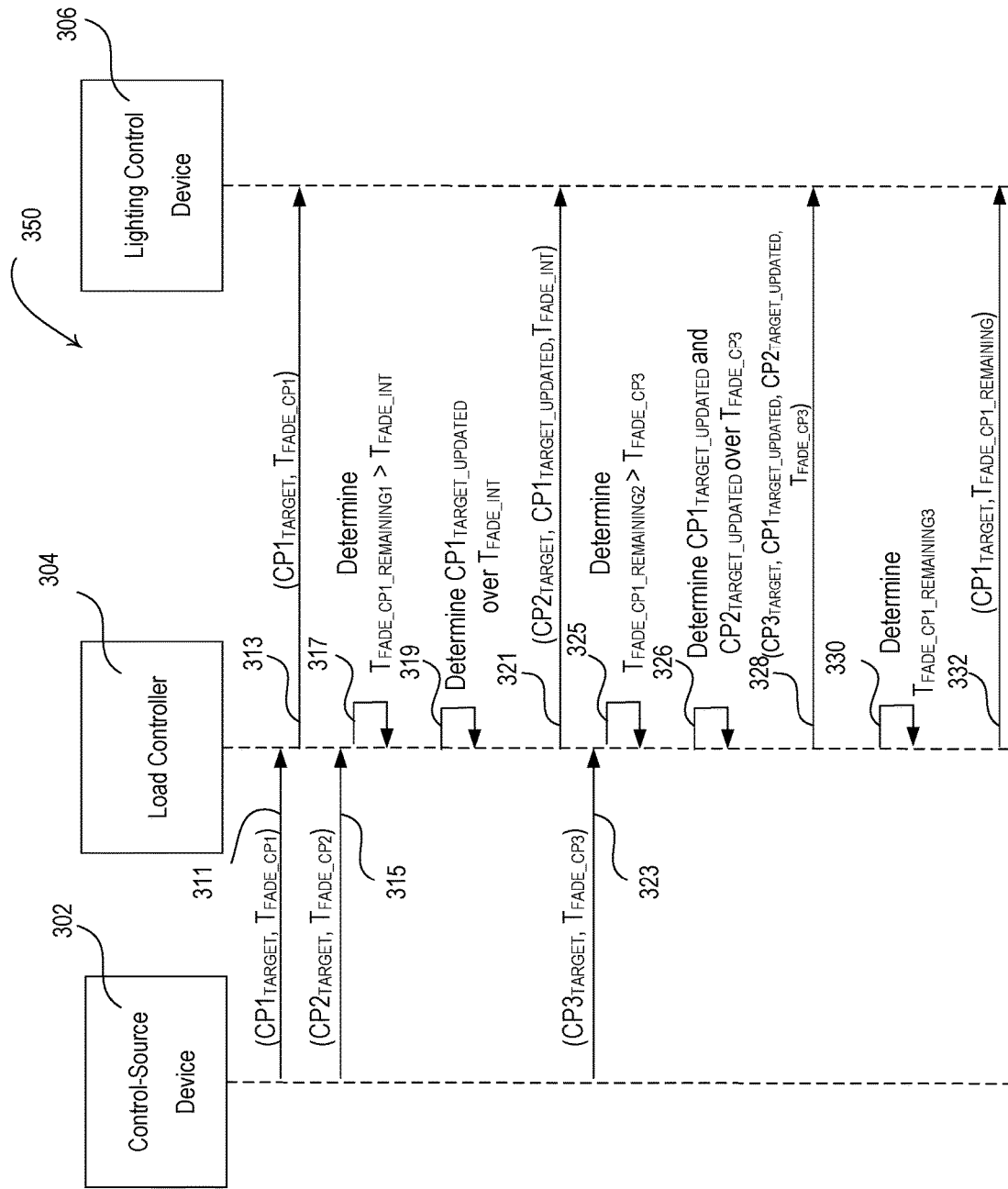

FIGS. 3A and 3B are example sequence diagrams 300 and 350 illustrating the operation of a load control system for controlling load control parameters over different fade times. The sequence diagrams 300 and 350 may depict the flow of messages communicated between an input device 302, a load controller 304 (e.g., the load controller 110 shown in FIG. 1), and a lighting control device 306 (e.g., the load control devices 122a, 122b shown in FIG. 1). Though the sequence diagrams 300 and 350 illustrate a lighting control device 306 and lighting control parameters being communicated in the messages between control devices for controlling a lighting load via the lighting control device 306, other load control devices may be similarly implemented to control other load control parameters as described herein. For example, the load control device may be a speaker, and the load control parameters may include an intensity (e.g., a volume) of the speaker. Additionally and/or alternatively, the load control parameters may include a temperature and/or a position of a covering that covers a motorized window treatment (e.g., a shade position). The load control parameters may be of the same type or of different types. Additionally, the input device 302 may represent a control device from which messages may have originated, or through which the messages may be communicated, prior to being received by the load controller 304. For example, the input device 302 may comprise a control device in the load control system from which messages may be transmitted, such as the network computing device 164, the remote control device 150, the wired sensor 166, and/or another device in the load control system 100 shown in FIG. 1. In another example, the input device 302 may represent a wired/wireless processor, such as the wired/wireless processor 140 shown in FIG. 1, from which messages may have originated or through which messages may be communicated from a control device.

As shown in FIG. 3A, the input device 302 may transmit a message 310 to the load controller 304 (e.g., at time $t_0$ as shown in FIG. 2B). The message 310 may comprise lighting control parameters for controlling a lighting load via the lighting control device 304. The lighting control parameters in the message 310 may comprise a target color temperature value $CCT_{TARGET}$ (e.g., a commanded target color temperature value) and a color temperature fade time $T_{FADE\_CCT}$ over which the color temperature of a corresponding lighting load is to be controlled by the lighting control device 304. The load controller 304 may receive the message 310, and, in response, the load controller 304 may transmit a message 312 comprising the target color temperature value $CCT_{TARGET}$ and the color temperature fade time $T_{FADE\_CCT}$. The load control device 306 may receive the message 312 and may begin controlling the color temperature of the corresponding lighting load to the target color temperature value $CCT_{TARGET}$ at a color temperature fade rate (e.g., which may be dependent upon the target color temperature value $CCT_{TARGET}$ and the color temperature fade time $T_{FADE\_CCT}$).

The input device 302 may transmit a message 314 to the load controller 304 comprising another fade time over which another lighting control parameter is to be controlled by the lighting control device 306 (e.g., at time $t_1$ as shown in FIG. 2B). For example, the message 314 may comprise a target lighting intensity value $L_{TARGET}$ and a lighting intensity fade time $T_{FADE\_INT}$. The lighting intensity fade time $T_{FADE\_INT}$ may be an intervening fade time, as the lighting control device 306 may currently be controlling another lighting control parameter (e.g., the color temperature) of its corresponding lighting load over another fade time (e.g., the color temperature fade time $T_{FADE\_CCT}$). The load controller 304 may receive the message 314, and, in response, the load controller 304 may determine at 316 that a first remaining color temperature fade time $T_{FADE\_CCT\_REMAINING1}$ is greater than the received lighting intensity fade time $T_{FADE\_INT}$. The first remaining color temperature fade time $T_{FADE\_CCT\_REMAINING1}$ that is determined at 316 may be a period of time remaining during the color temperature fade time $T_{FADE\_CCT}$ after the message 314 is received (e.g., $T_{FADE\_CCT\_REMAINING1} = t_3 - t_1$ as shown in FIG. 2B).

At 318, the load controller 304 may determine an updated target color temperature value $CCT_{TARGET\_UPDATED}$ for controlling the color temperature of the lighting load over the lighting intensity fade time $T_{FADE\_INT}$. The updated target color temperature value $CCT_{TARGET\_UPDATED}$ may be calculated to maintain a continuous fade rate for the color temperature controlled by the lighting control device 306 over the commanded color temperature fade time $T_{FADE\_CCT}$. For example, the updated target color temperature value $CCT_{TARGET\_UPDATED}$ may be the color temperature at the end of the lighting intensity fade time $T_{FADE\_INT}$ if the color temperature continued at the color temperature fade rate during the lighting intensity fade time $T_{FADE\_INT}$. As a result, the fade rate of the color temperature before receiving the message 314 may be equal to the fade rate of the color temperature after receiving the message 314, such that the color temperature fade rate of the color temperature is constant over the entire length of the color temperature fade time $T_{FADE\_CCT}$.

The load controller 304 may transmit the message 320 to the lighting control device 306 for controlling the corresponding lighting load based on the determined lighting control parameters. For example, the message 320 may include the target value LTRGT, the updated target color temperature value $CCT_{TARGET\_UPDATED}$, and the lighting intensity fade time $T_{FADE\_INT}$ to the lighting control device 306. The lighting control device 306 may receive the message 320 and, in response, control the lighting intensity of the corresponding lighting load to the target lighting intensity value $L_{TARGET}$ (e.g., at a lighting intensity fade rate) and control the color temperature of the corresponding lighting load to the updated target color temperature value $CCT_{TARGET\_UPDATED}$ (e.g., at the color temperature fade rate) over the lighting intensity fade time $T_{FADE\_INT}$.

At 322, the load controller 304 may determine a second remaining color temperature fade time $T_{FADE\_CCT\_REMAINING2}$, which may be a period of time remaining during the color temperature fade time $T_{FADE\_CCT}$ after the lighting intensity fade time $T_{FADE\_INT}$ (e.g., $T_{FADE\_CCT\_REMAINING2} = t_3 - t_2$ as shown in FIG. 2B). The load controller 304 may transmit a message 324 to the lighting control device 306 that is configured to continue control of the lighting control parameter having a remaining fade time (e.g., the color temperature) at the end of the lighting intensity fade time $T_{FADE\_INT}$. The message 324 may comprise the target color temperature value $CCT_{TARGET}$ (e.g., the initial/commanded target color temperature value) that was received in the message 310 and the second remaining color temperature fade time $T_{FADE\_CCT\_REMAINING2}$. The second remaining color temperature fade time $T_{FADE\_CCT\_REMAINING2}$ that is transmitted in the message 324 may comprise the color temperature fade time $T_{FADE\_CCT}$ minus the end of the intervening lighting intensity fade time $T_{FADE\_INT}$. The load control device 306 may receive the message 324 and, in response, control the corresponding lighting load toward the target color temperature value $CCT_{TARGET}$ over the second remaining color temperature fade time $T_{FADE\_CCT\_REMAINING2}$.

While the sequence diagram 300 shown in FIG. 3A depicts a color temperature and a lighting intensity as example load control parameters for controlling an electrical load over different fade times, the load control parameters may include any other suitable load control parameters that may be used for controlling an electrical load over a fade time. Additionally, while the sequence diagram 300 shows control of a lighting load in response to receipt of two overlapping fade times (e.g., the color temperature fade time $T_{FADE\_CCT}$ and the lighting intensity fade time $T_{FADE\_INT}$), load control devices may similarly control a corresponding electrical load in response to additional fade times over the same period.

In an example, the sequence diagram 350 shown in FIG. 3B includes similar messages to the sequence diagram 300 shown in FIG. 3A for enabling control of color temperature and lighting intensity in response to receipt of multiple fade times at the load controller 304.

As shown in FIG. 3B, the input device 302 may transmit a message 311 to the load controller 304 (e.g., at time $t_0$ as shown in FIG. 2B). The message 311 may comprise lighting control parameters for controlling a lighting load via the lighting control device 306. The lighting control parameters in the message 311 may comprise a first load control parameter target value $CP1_{TARGET}$ and a first load control parameter fade time $T_{FADE\_CP1}$ over which the first load control parameter of a corresponding lighting load is to be controlled by the lighting control device 306 to the first load control parameter target value $CP1_{TARGET}$. For example, the first load control parameter may be a color temperature. The first load control parameter target value $CP1_{TARGET}$ may be a target color temperature value (e.g., a commanded target color temperature value), and the first load control parameter fade time $T_{FADE\_CP1}$ may be a color temperature fade time over which the color temperature of the corresponding lighting load is to be controlled by the lighting control device 306 to the first load control parameter target value $CP1_{TARGET}$. The load controller 304 may receive the message 311, and, in response, the load controller 304 may transmit a message 313 comprising the first load control parameter target value $CP1_{TARGET}$ and the first load control parameter fade time $T_{FADE\_CP1}$. The load control device 306 may receive the message 313 and may begin controlling the color temperature of the corresponding lighting load towards the first load control parameter target value $CP1_{TARGET}$ at a color temperature fade rate (e.g., which may be dependent upon the first load control parameter target value $CP1_{TARGET}$ and the first load control parameter fade time $T_{FADE\_CP1}$).

The input device 302 may transmit a message 315 to the load controller 304 comprising another fade time over which another lighting control parameter is to be controlled by the lighting control device 306 (e.g., at time $t_1$ as shown in FIG. 2B). For example, the message 315 may comprise a second load control parameter target value $CP2_{TARGET}$ and a second load control parameter fade time $T_{FADE\_CP2}$. For example, the second load control parameter may be a lighting intensity. The second load control parameter target value $CP2_{TARGET}$ may be a target lighting intensity value, and the second load control parameter fade time $T_{FADE\_CP2}$ may be a lighting intensity fade time. The second load control parameter fade time $T_{FADE\_CP2}$ may be an intervening fade time, as the lighting control device 306 may currently be controlling another lighting control parameter (e.g., the first load control parameter) of its corresponding lighting load over another fade time (e.g., the first load control parameter fade time $T_{FADE\_CP1}$). The load controller 304 may receive the message 315, and, in response, the load controller 304 may determine at 317 that a remaining first load control parameter fade time $T_{FADE\_CP1\_REMAINING1}$ is greater than the received second load control parameter fade time $T_{FADE\_CP2}$. The remaining first load control parameter fade time $T_{FADE\_CP1\_REMAINING1}$ that is determined at 317 may be a period of time remaining during the first load control parameter fade time $T_{FADE\_CP1}$ after the message 315 is received (e.g., $T_{FADE\_CP1\_REMAINING1} = t_3 - t_1$ as shown in FIG. 2B).

At 319, the load controller 304 may determine an updated target first load control parameter value $CP_{TARGET\_UPDATED}$ for controlling the first load control parameter of the lighting load over the second load control parameter fade time $T_{FADE\_CP2}$. The updated first load control parameter target value $CP1_{TARGET\_UPDATED}$ may be calculated to maintain a continuous fade rate for the first load control parameter controlled by the lighting control device 306 over the first load control parameter fade time $T_{FADE\_CP1}$. For example, the updated first load control parameter target value $CP1_{TARGET\_UPDATED}$ may be the first load control parameter at the end of the second load control parameter fade time $T_{FADE\_CP2}$ if the first load control parameter continued at the first load control parameter fade rate during the second load control parameter fade time $T_{FADE\_CP2}$. As a result, the fade rate of the first load control parameter before receiving the message 315 may be equal to the fade rate of the first load control parameter after receiving the message 315, such that the first load control parameter fade rate of the first load control parameter is constant over the entire length of the first load control parameter fade time $T_{FADE\_CP1}$.

The load controller 304 may transmit the message 321 to the lighting control device 306 for controlling the corresponding lighting load based on the determined lighting control parameters. For example, the message 321 may include the second load control parameter target value $CP2_{TARGET}$, the updated first load control parameter target value $CP1_{TARGET\_UPDATED}$, and the second load control parameter fade time $T_{FADE\_CP2}$ to the lighting control device 306.

The load controller 304 may receive a message 323 comprising another load control parameter for being controlled over another fade time. For example, the message 323 may include a third load control parameter target value $CP3_{TARGET}$ and a third load control parameter fade time $T_{FADE\_CP3}$ over which the third load control parameter of the corresponding lighting load may be controlled to the third load control parameter target value $CP3_{TARGET}$. For example, the third load control parameter may be a color spectrum value (e.g., a color vibrancy level and/or color saturation level). The third load control parameter target value $CP3_{TARGET}$ may be a color spectrum value (e.g., commanded target color spectrum value), and the third load control parameter fade time $T_{FADE\_CP3}$ may be a color spectrum fade time over which the color spectrum level of the light reflected from the corresponding lighting load may be controlled. For example, the third load control parameter target value $CP3_{TARGET}$ may be indicated by one or more vibrancy levels configured to control the lighting load, as described herein.

The load controller 304 may receive the message 323 after the second load control parameter fade time $T_{FADE\_CP2}$ has ended. If the second load control parameter fade time $T_{FADE\_CP2}$ has ended, the third load control parameter fade time $T_{FADE\_CP3}$ may be a second intervening fade time received during the first load control parameter fade time $T_{FADE\_CP1}$. In response to the message 323, the load controller 304 may determine at 325 that a second remaining first load control parameter fade time $T_{FADE\_CP1\_REMAINING2}$ is greater than the intervening third load control parameter fade time $T_{FADE\_CP3}$. The second remaining first load control parameter fade time $T_{FADE\_CP1\_REMAINING2}$ may be a period of time remaining after receipt of the message 323 for controlling the lighting control device 306. At 326, the load controller 304 may determine a second updated first load control parameter value $CP1_{TARGET\_UPDATED}$. The second updated first load control parameter value $CP1_{TARGET\_UPDATED}$ may be the first load control parameter value to which the lighting load is to be controlled over the intervening third load control parameter fade time $T_{FADE\_CP3}$. For example, the second updated first load control parameter value $CP1_{TARGET\_UPDATED}$ may be calculated to maintain a continuous fade rate for the first load control parameter of the lighting control device over the first load control parameter fade time $T_{FADE\_CP1}$. The load controller 304 may transmit the message 328 to the lighting control device 306 for controlling the corresponding lighting load based on the determined lighting control parameters. For example, the message 328 may include the third load control parameter target value $CP3_{TARGET}$, the second updated first load control parameter value $CP1_{TARGET\_UPDATED}$, and the third load control parameter fade time $T_{FADE\_CP3}$. The lighting control device 306 may receive the message 328 and, in response, control the third load control parameter of the corresponding lighting load to the target third load control parameter value $CP3_{TARGET}$ and control the first load control parameter of the corresponding lighting load to the second updated first load control parameter value $CP1_{TARGET\_UPDATED}$ third load control parameter target value first load control parameter target value, respectively, over the third load control parameter fade time $T_{FADE\_CP3}$.

If the lighting load is still being controlled over the second load control parameter fade time $T_{FADE\_CP2}$ when the message 323 is received, the load controller 304 may compare the third load control parameter fade time $T_{FADE\_CP3}$ to the second remaining first load control parameter fade time $T_{FADE\_CP1\_REMAINING2}$ and a remaining second load control parameter fade time $T_{FADE\_CP2\_REMAINING}$. The second remaining first load control parameter fade time $T_{FADE\_CP1\_REMAINING2}$ and the remaining second load control parameter fade time $T_{FADE\_CP2\_REMAINING}$ may be calculated as the remaining fade time for the commanded first load control parameter fade time $T_{FADE\_CP1}$ and the commanded second load control parameter fade time $T_{FADE\_CP2}$, respectively, when the message 323 is received. The load controller 304 may determine the lowest remaining fade time (e.g., the shorter of $T_{FADE\_CP1}$ and $T_{FADE\_CP2}$) for controlling a load control parameter and determine the updated target load control values for each parameter that is not originally being controlled over the lowest remaining fade time. For example, the load controller 304 may determine at 325 that the second remaining first load control parameter fade time $T_{FADE\_CP1\_REMAINING2}$ and the remaining second load control parameter fade time $T_{FADE\_CP2\_REMAINING}$ are both greater than the third load control parameter fade time $T_{FADE\_CP3}$. At 326, the load controller 304 may determine a second updated first load control parameter value $CP1_{TARGET\_UPDATED}$ and updated target second load control parameter value $CP2_{TARGET\_UPDATED}$ for controlling the lighting load over the third load control parameter fade time $T_{FADE\_CP3}$. The second updated first load control parameter value $CP1_{TARGET\_UPDATED}$ and the updated second load control parameter target value $CP2_{TARGET\_UPDATED}$ may be calculated to maintain a continuous fade rate for the first load control parameter and the second load control parameter, respectively, over the commanded fade times (e.g., first load control parameter fade time $T_{FADE\_CP1}$ and second load control parameter fade time $T_{FADE\_CP2}$). The load controller 304 may transmit a message to the lighting control device 306 for controlling the corresponding lighting load based on the determined lighting control parameters. For example, the message may include the third load control parameter target value $CP3_{TRGT}$, the second updated first load control parameter target value $CP1_{TARGET\_UPDATED}$, the updated second load control parameter target value $CP2_{TARGET\_UPDATED}$, and the third load control parameter fade time $T_{FADE\_CP3}$ over which the lighting control parameters are to be controlled.

After the transmission of the message or messages for controlling the lighting control parameters over the third load control parameter fade time $T_{FADE\_CP3}$, the load controller 304 may continue to determine updated lighting control parameters for controlling the lighting control parameters over the lowest remaining fade time until a single remaining fade time exists. For example, at 330, the load controller 304 may determine that the first load control parameter fade time $T_{FADE\_CP1}$ is the fade time that is remaining after the other fade times expire. The load controller 304 may determine, at 330, a third remaining first load control parameter fade time $T_{FADE\_CP1\_REMAINING3}$ after the expiration of the other one or more intervening fade times. The load controller 304 may send a message 332 for controlling the first load control parameter value over the third remaining first load control parameter fade time $T_{FADE\_CP1\_REMAINING3}$. For example, the message 332 may include the commanded first load control parameter target value $CP1_{TARGET}$ to which the lighting control device was originally being controlled.

Though a single input device 302 and/or lighting control device 306 is shown, messages may be received from one or more input devices at the load controller 304 that are configured to cause control of one or more load control device over different fade times. Additionally, though the messages that are received by the load controller 304 may comprise the load control parameters themselves for controlling one or more electrical loads, the load controller may be capable of receiving other inputs and generating the load control parameters in response to the inputs that are received. For example, the load controller 304 may receive an indication of a button press from a remote control device or sensor information from a sensor device and may generate the lighting control parameters (e.g., color temperature values, lighting intensity values, saturation values, fade rates, and/or other lighting control parameters) for controlling the lighting load in response to the received inputs.

Figure 4A:
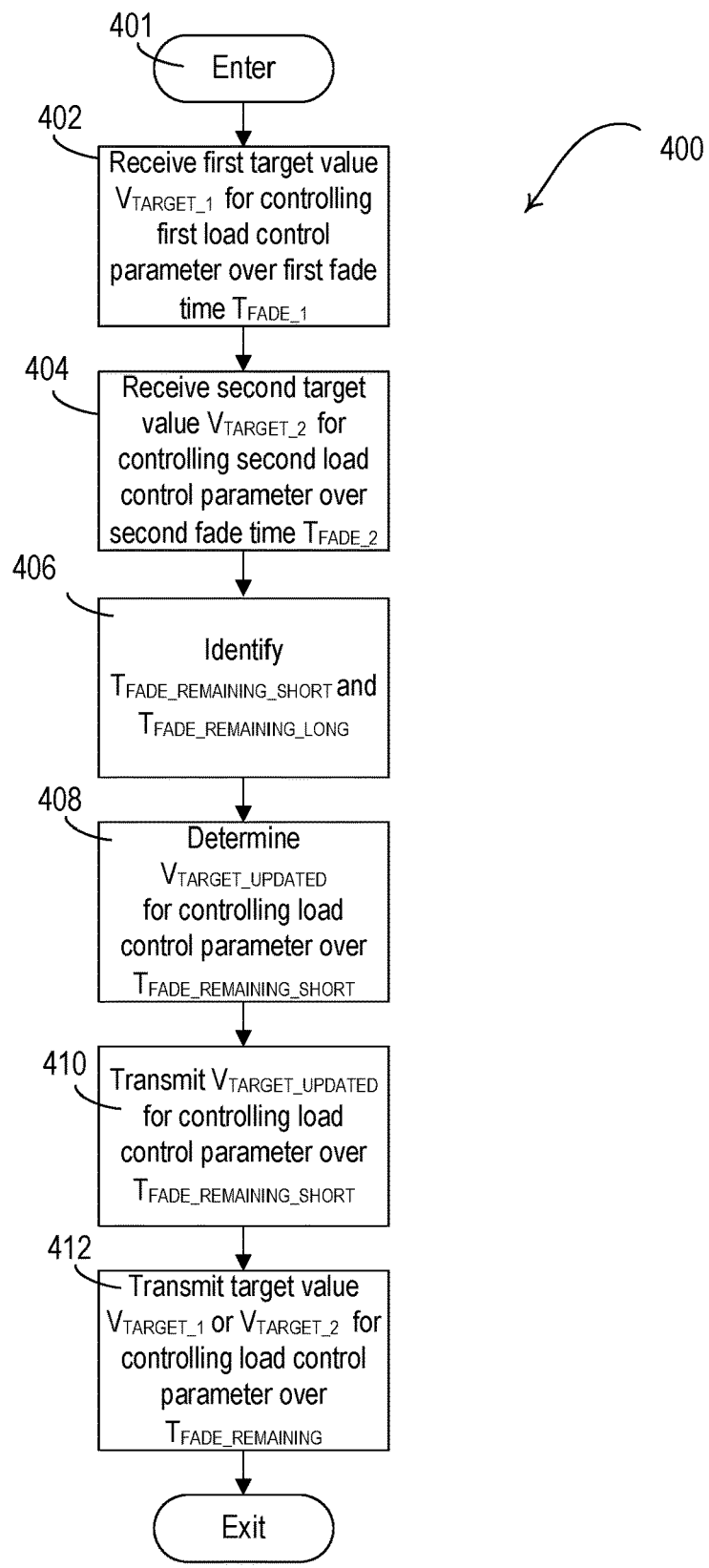
FIGS. 4A-4B are example flowcharts for controlling load control parameters over multiple fade times.

FIG. 4A is an example flowchart of a control procedure 400 for controlling load control parameters according to multiple fade times. The procedure 400 may be performed by a load controller, such as the load controller 110 shown in FIG. 1, or another device in the load control system. For example, the procedure 400 may be performed by a wired/wireless processor, such as the wired/wireless processor 140 shown in FIG. 1, or another local or remote computing device. Though the procedure 400 may be described herein as being performed by a single device, such as a load controller, the procedure 400 may be distributed across multiple devices.

The load controller may enter the control procedure 400 at 401. For example, the procedure 400 may begin at 401 in response to receiving a message, periodically, and/or at preprogrammed times. The load controller may receive load control parameters for controlling an electrical load over different fade times. For example, at 402, the load controller may receive a first target value $V_{TARGET\_1}$ to which a first load control parameter is to be controlled over a first fade time $T_{FADE\_1}$ (e.g., at a first fade rate). At 404, the load controller may receive a second target value $V_{TARGET\_2}$ to which a second load control parameter is to be controlled over a second fade time $T_{FADE\_2}$ (e.g., at a second fade rate). For example, the load control parameters may include lighting control parameters for controlling a lighting load. The first lighting control parameter may be a lighting intensity and the second lighting control parameter may be a color temperature, though other load control parameters may be similarly controlled. The load controller may receive the first target value $V_{TARGET\_1}$ and/or the first fade time $T_{FADE\_1}$ for controlling the first load control parameter, at the same time as, or before the second target value $V_{TARGET\_2}$ and/or the second fade time $T_{FADE\_2}$ for controlling the second load control parameter.

The load controller may determine a first remaining fade time $T_{FADE\_REMAINING\_1}$ for the first fade time $T_{FADE\_1}$ and a second remaining fade time $T_{FADE\_REMAINING\_2}$ for the fade time $T_{FADE\_2}$. At 406, the load controller may determine which of the first remaining fade time $T_{FADE\_REMAINING\_1}$ and the second remaining fade time $T_{FADE\_REMAINING\_2}$ is shorter. The load controller may identify the shorter of the first remaining fade time $T_{FADE\_REMAINING\_1}$ and the second remaining fade time $T_{FADE\_REMAINING\_2}$ as $T_{FADE\_REMAINING\_SHORT}$ and the longer of the two as $T_{FADE\_REMAINING\_LONG}$. As the load control device may be limited to controlling each load control parameter over the same fade time, at 408 the load controller may determine an updated target value $V_{TARGET\_UPDATED}$ for controlling the load control parameter that has the longer remaining fade time $T_{FADE\_REMAINING\_LONG}$ over the shorter remaining fade time $T_{FADE\_REMAINING\_SHORT}$. For example, the load controller may determine the updated target value $V_{TARGET\_UPDATED}$ such that the load control parameter with the longer remaining fade time $T_{FADE\_REMAINING\_LONG}$ maintains its commanded fade rate (e.g., one of the first fade rate or the second fade rate) over the shorter remaining fade time $T_{FADE\_REMAINING\_SHORT}$. Accordingly, the load controller may maintain the fade rate of the load control parameter over the entirety of the longer fade time of the first fade time $T_{FADE\_1}$ or the second fade time $T_{FADE\_2}$.

At 410, the load controller may transmit the updated target value $V_{TARGET\_UPDATED}$ for controlling the load control parameter with the longer remaining fade time $T_{FADE\_REMAINING\_LONG}$. The updated target value $V_{TARGET\_UPDATED}$ may be transmitted with the target value (e.g., one of the first target value $V_{TARGET\_1}$ or the second target value $V_{TARGET\_2}$) for controlling the other load control parameter (e.g., for controlling the load control parameter with the shorter remaining fade time $T_{FADE\_REMAINING\_SHORT}$) and the shorter remaining fade time $T_{FADE\_REMAINING\_SHORT}$. The load control device may update the control of the load control parameters based on the received values.

After the shorter remaining fade time $T_{FADE\_REMAINING\_SHORT}$ has expired, the load control device may continue to fade the load control parameter that had the longer remaining fade time $T_{FADE\_REMAINING\_LONG}$ over the remaining portion of the commanded fade time (e.g., one of the first fade time $T_{FADE\_1}$ or the second fade time $T_{FADE\_2}$). At 412, the load controller may determine the remaining fade time $T_{FADE\_REMAINING}$ of the commanded fade time (e.g., one of the first fade time $T_{FADE\_1}$ or the second fade time $T_{FADE\_2}$) and transmit the commanded target value (e.g., one of the first target value $V_{TARGET\_1}$ or the second target value $V_{TARGET\_2}$) and the remaining fade time $T_{FADE\_REMAINING}$ for controlling the load control parameter that had the longer remaining fade time $T_{FADE\_REMAINING\_LONG}$. For example, the load controller may transmit the commanded target value (e.g., one of the first target value $V_{TARGET\_1}$ or the second target value $V_{TARGET\_2}$) after the end of the shorter remaining fade time $T_{FADE\_REMAINING\_SHORT}$. Accordingly, the load controller may, through the control procedure 400, control two load control parameters over two different fade times simultaneously. After transmitting the commanded target value, the load controller may exit the control procedure 400.

Though the procedure 400 shown in FIG. 4A may illustrate control of a first load control parameter and a second load control parameter having respective fade times, two or more load control parameters may be similarly controlled to maintain respective fade rates over two or more corresponding fade times. For example, the load controller may identify a shortest remaining fade time of the plurality of the fade times $T_{FADE}$ for each of the load control parameters being controlled. An updated target value may be calculated for each load control parameter that does not have the shortest remaining fade time in the same manner as described herein for simulating the commanded fade rate (e.g., initial fade rate) for the load control parameter. The updated target values may be transmitted in a message to the load control device with the commanded target value for the load control parameter having the shortest remaining fade time. The load control device may control each of the load control parameters according to the received values over the shortest remaining fade time. The load controller may continue to calculate updated target values for controlling each of the load control parameters over the shortest remaining fade time until a single remaining fade time is left for a load control parameter. The load controller may then transmit the commanded target value and the remaining fade time for the load control parameter to the load control device for simulating the commanded fade rate for the load control parameter.

Figure 4B:
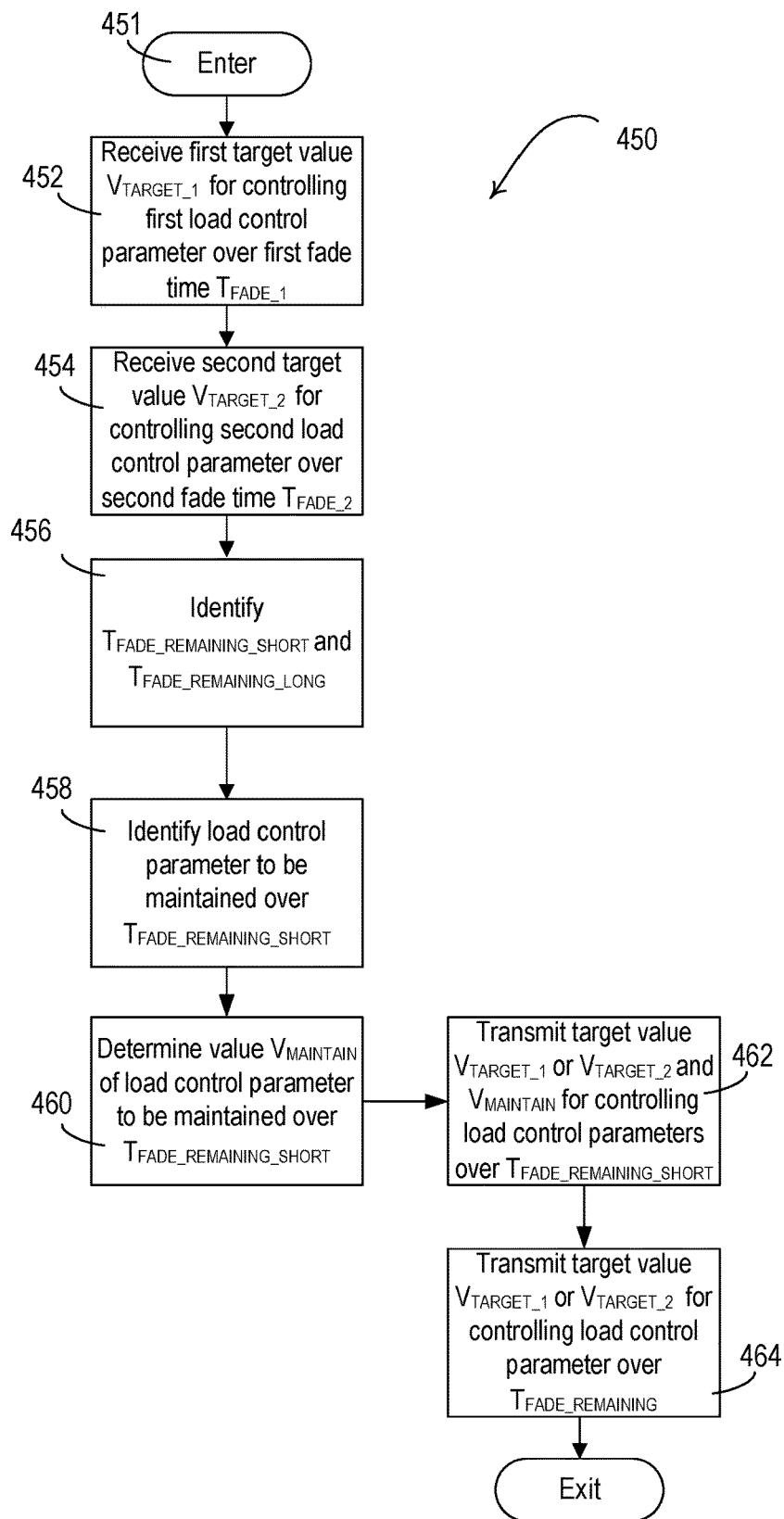

FIG. 4B is an example flowchart of a control procedure 450 for controlling load control parameters according to multiple fade times. The procedure 450 may be performed by a load controller, such as the load controller 110 shown in FIG. 1, or another device in the load control system. For example, the procedure 450 may be performed by a wired/wireless processor, such as the wired/wireless processor 140 shown in FIG. 1, or another local or remote computing device. Though the procedure 450 may be described herein as being performed by a single device, such as a load controller, the procedure 450 may be distributed across multiple devices.

The load controller may enter the control procedure 450 at 451. For example, the procedure 450 may begin at 451 in response to receiving a message, periodically, and/or at preprogrammed times. The load controller may receive load control parameters for controlling an electrical load over different fade times. For example, at 452, the load controller may receive a first target value $V_{TARGET\_1}$ to which a first load control parameter is to be controlled over a first fade time $T_{FADE\_1}$ (e.g., at a first fade rate). At 454, the load controller may receive a second target value $V_{TARGET\_2}$ to which a second load control parameter is to be controlled over a second fade time $T_{FADE\_2}$ (e.g., at a second fade rate). For example, the load control parameters may include lighting control parameters for controlling a lighting load. The first lighting control parameter may be a lighting intensity and the second lighting control parameter may be a color temperature, though other load control parameters may be similarly controlled. The load controller may receive the first target value $V_{TARGET\_1}$ and/or the first fade time $T_{FADE\_1}$ for controlling the first load control parameter, at the same time as, or before, the second target value $V_{TARGET\_2}$ and/or the second fade time $T_{FADE\_2}$ for controlling the second load control parameter.

The load controller may determine a first remaining fade time $T_{FADE\_REMAINING\_1}$ for the first fade time $T_{FADE\_1}$ over which the first load control parameter is to be controlled and a second remaining fade time $T_{FADE\_REMAINING\_2}$ for the second fade time $T_{FADE\_2}$ over which the second load control parameter is to be controlled. At 456, the load controller may determine which of the first remaining fade time $T_{FADE\_REMAINING\_1}$ and the second remaining fade time $T_{FADE\_REMAINING\_2}$ is shorter. The load controller may identify the shorter of the first remaining fade time $T_{FADE\_REMAINING\_1}$ and the second remaining fade time $T_{FADE\_REMAINING\_2}$ as $T_{FADE\_REMAINING\_SHORT}$ and the longer of the two as $T_{FADE\_REMAINING\_LONG}$.

At 458, the load controller may identify a load control parameter to be maintained over the shorter remaining fade time $T_{FADE\_REMAINING\_SHORT}$. For example, the load control parameter to be maintained may be the load control parameter associated with the longer remaining fade time $T_{FADE\_REMAINING\_LONG}$. At 460, the load controller may determine a maintain value $V_{MAINTAIN}$ of the identified load control parameter. The maintain value $V_{MAINTAIN}$ may be a current value of the identified load control parameter. The load controller may determine the maintain value $V_{MAINTAIN}$ based on a calculation. For example, the load controller may calculate the maintain value $V_{MAINTAIN}$ based on an initial value of the load control parameter, a fade rate of the load control parameter, and an amount of time elapsed since an initial time (e.g., the time at which the command to fade the load control parameter was received).

At 462, the load controller may transmit the target value (e.g., one of the first target value $V_{TARGET\_1}$ or the second target value $V_{TARGET\_2}$) of the load control parameter associated with the shorter remaining fade time $T_{FADE\_REMAINING\_SHORT}$ and the maintain value $V_{MAINTAIN}$ of the load control parameter associated with the longer remaining fade time $T_{FADE\_REMAINING\_LONG}$. For example, if the load controller identifies the first remaining fade time $T_{FADE\_REMAINING\_1}$ as the shorter remaining fade time $T_{FADE\_REMAINING\_SHORT}$, the load controller may transmit the first target value $V_{TARGET\_1}$ associated with the first load control parameter. Conversely, if the load controller identifies the second remaining fade time $T_{FADE\_REMAINING\_2}$ as the shorter remaining fade time $T_{FADE\_REMAINING\_SHORT}$, the load controller may transmit the second target value V TARGET_2 associated with the second load control parameter. The load controller may transmit the shorter remaining fade time $T_{FADE\_REMAINING\_SHORT}$ along with the selected target value and the maintain value $V_{MAINTAIN}$. Additionally and/or alternatively, the load controller may transmit a stop command to the load control device. The stop command may instruct the load control device to stop fading the load control parameter associated with the longer remaining fade time $T_{FADE\_REMAINING\_LONG}$ and to maintain the load control parameter at a current value. In this way, the load controller may maintain the load control parameter associated with the longer remaining fade time $T_{FADE\_REMAINING\_LONG}$ at a constant value while the load control parameter associated with the shorter remaining fade time $T_{FADE\_REMAINING\_SHORT}$ approaches the corresponding target value.

After the shorter remaining fade time $T_{FADE\_REMAINING\_SHORT}$ has expired, the load control device may resume fading the load control parameter that had the longer remaining fade time $T_{FADE\_REMAINING\_LONG}$ over the remaining portion of the commanded fade time (e.g., one of the first fade time $T_{FADE\_1}$ or the second fade time $T_{FADE\_2}$). At 464, the load controller may determine the remaining fade time $T_{FADE\_REMAINING}$ of the commanded fade time (e.g., one of the first fade time $T_{FADE\_1}$ or the second fade time $T_{FADE\_2}$) and transmit the commanded target value (e.g., one of the first target value $V_{TARGET\_1}$ or the second target value $V_{TARGET\_2}$) and the remaining fade time $T_{FADE\_REMAINING}$ for controlling the load control parameter that had the longer remaining fade time $T_{FADE\_REMAINING\_LONG}$. For example, the load controller may transmit the commanded target value (e.g., one of the first target value $V_{TARGET\_1}$ or the second target value $V_{TARGET\_2}$) after the end of the shorter remaining fade time $T_{FADE\_REMAINING\_SHORT}$. Additionally and/or alternatively, the load controller may transmit a resume command to the load control device. The stop command may instruct the load control device to resume fading the load control parameter associated with the longer remaining fade time $T_{FADE\_REMAINING\_LONG}$. Accordingly, the load controller may, through the control procedure 450, control two load control parameters over two different fade times simultaneously. After transmitting the commanded target value, the load controller may exit the control procedure 450.

Though the procedure 450 shown in FIG. 4B may illustrate control of a first load control parameter and a second load control parameter having respective fade times, more than two load control parameters may be used. For example, the load controller may (e.g., simultaneously) receive command(s) for controlling three different load control parameters over three different fade times. The load controller may control a first load control parameter of the three load control parameters, then a second load control parameter, and finally a third load control parameter, for example with the control parameters being controlled according to their respective fade times.

In an example (e.g., as shown in FIG. 2C), the first load control parameter may be a color temperature of a lighting load associated with a lighting control device, and the second control parameter may be a lighting intensity of the lighting load. At an initial time to, the color temperature and the lighting intensity may have initial values (e.g., 3200 K and 10%, respectively). At the initial time to, the load controller may receive a message that includes a first (e.g., target) color temperature value and a color temperature fade time $T_{FADE\_CCT}$. The load controller may transmit the first target color temperature value and the color temperature fade time $T_{FADE\_CCT}$ to the lighting control device, and the lighting control device may determine a color temperature fade rate, and may begin to fade the color temperature of the lighting load at the determined color temperature fade rate. The load controller may receive, at time $t_1$, a message that includes a second (e.g., target) lighting intensity value and a lighting intensity fade time $T_{FADE\_INT}$. The load controller may determine a remaining color temperature fade time $T_{FADE\_CCT\_REMAINING}$, and may determine that the lighting intensity fade time $T_{FADE\_INT}$ is less than the remaining color temperature fade time $T_{FADE\_CCT\_REMAINING}$.

As the lighting control device may be limited to controlling each of the lighting control parameters using a common fade time for all control parameters, the lighting control device may maintain the same color temperature value constant while the lighting control device is adjusting the lighting intensity value over the lighting intensity fade time $T_{FADE\_INT}$ from time $t_1$ to time $t_2$. The load controller may transmit a message to the lighting control device to control the lighting intensity over the lighting intensity fade time $T_{FADE\_INT}$ from time $t_1$ to time $t_2$, while maintaining the color temperature value at the value it held at time $t_1$ (e.g., a current or maintain value). For example, the load controller may transmit a message to the lighting control device that includes the target lighting intensity value, the maintain value for the color temperature, and the lighting intensity fade time $T_{FADE\_INT}$. After the lighting intensity fade time $T_{FADE\_INT}$ has ended at time $t_2$, the lighting control device may then control the color temperature value over the remaining color temperature fade time $T_{FADE\_CCT\_REMAINING}$ from the time $t_2$ to the time $t_3$. For example, the load controller may transmit another message to the lighting control device at time $t_2$ to control the color temperature value over the remaining color temperature fade time $T_{FADE\_CCT\_REMAINING}$ toward the second (e.g., target) color temperature value.

Instructing the lighting control device to maintain its color temperature value (e.g., not change) for the duration of the intervening lighting intensity fade time $T_{FADE\_INT}$ may allow the fade rate of the color temperature value to approximate (e.g., simulate) the target color temperature fade curve to achieve the second (e.g., target) color temperature value over the color temperature fade time $T_{FADE\_CCT}$. The adjusted color temperature fade rate along the actual color temperature fade curve between time $t_2$ and time $t_3$, however, may different than the color temperature fade rate along the target color temperature fade curve. Controlling the lighting load to remain constant at the color temperature value while the lighting intensity value is adjusted over the lighting intensity fade time $T_{FADE\_INT}$ instead of calculating an updated color temperature value to which to control the color temperature over the lighting intensity fade time $T_{FADE\_INT}$ may simplify the calculations performed at the load controller and/or the message received by the load control device.

Figure 5:
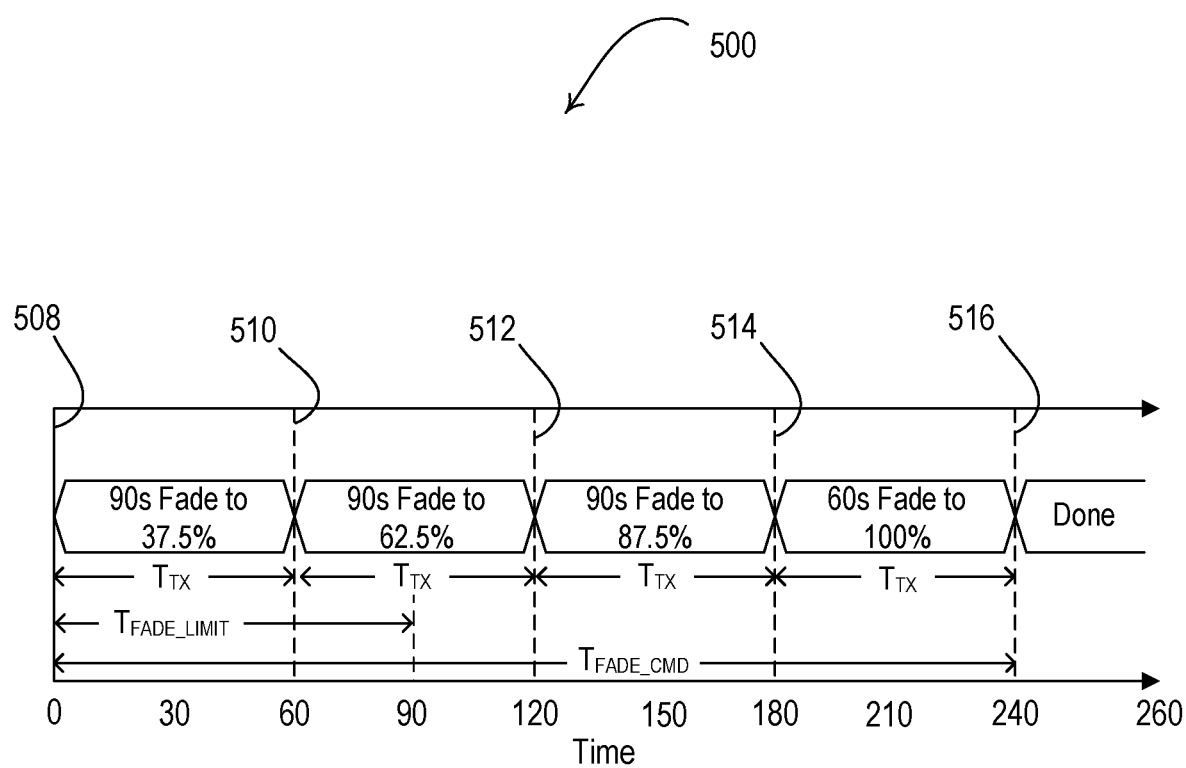
FIG. 5 is an example timing diagram for controlling a load control parameter using a limited fade time $T_{FADE\_LIMIT}$.

FIG. 5 is an example timing diagram 500 illustrating a timing diagram for illustrating the transmission of messages for controlling a load control parameter using a limited fade time $T_{FADE\_LIMIT}$. The messages illustrated in the timing diagram 500 may be transmitted by a load controller, such as the load controller 110 shown in FIG. 1, or another device in the load control system. For example, the messages in the timing diagram 500 may be transmitted by a wired/wireless processor, such as the wired/wireless processor 140 shown in FIG. 1, or another local or remote computing device.

The timing diagram 500 may illustrate the transmission of messages for controlling an electrical load over a commanded fade time $T_{FADE\_CMD}$ in response to messages transmitted from the load controller to a load control device (e.g., the load control devices 122a, 122b of FIG. 1). The load controller may receive the commanded fade time $T_{FADE\_CMD}$ or otherwise determine the commanded fade time $T_{FADE\_CMD}$ from messages received from control devices in the load control system. The load controller may also receive and/or determine a commanded target value $V_{TARGET}$ to which a load control parameter is to be controlled over the commanded fade time $T_{FADE\_CMD}$. For example, messages may be sent for controlling a lighting control parameter, such as a lighting intensity or another lighting control parameter, over the commanded fade time $T_{FADE\_CMD}$. Though the timing diagram 500 depicts a timing sequence for controlling a single lighting control parameter, multiple lighting control parameters (e.g., intensity, color, saturation) or other load control parameters may be similarly controlled.

As shown in FIG. 5, the commanded fade time $T_{FADE\_CMD}$ may be four minutes and the a load control device may control the lighting intensity from a commanded lighting intensity value $L_{CMD}$ of zero percent to a target lighting intensity value $L_{TARGET}$ of one hundred percent (e.g., at a constant fade rate $r_{CON}$). The load controller may determine that the commanded fade time $T_{FADE\_CMD}$ over which the lighting intensity is to be continuously controlled is longer than a limited fade time $T_{FADE\_LIMIT}$, which may set a limit on the value of the fade time that may be included in a single command for controlling the lighting load. For example, the limited fade time $T_{FADE\_LIMIT}$ may be a maximum period of time supported for controlling a load control parameter at a load control device in a single command and/or a maximum period of time the load controller is preconfigured to transmit as a fade time for controlling a load control parameter.

When the commanded fade time $T_{FADE\_CMD}$ is longer than the limited fade time $T_{FADE\_LIMIT}$, the load controller may divide the target lighting intensity value (e.g., 100%) into one or more intermediate target lighting intensity values $V_{TARGET\_INTER}$. For example, at 508, the load controller may transmit a message that comprises an intermediate target lighting intensity value $V_{TARGET\_INTER}$ (e.g., 37.5%) configured to instruct the lighting control device to control the lighting intensity of a corresponding lighting load from a current value (e.g., 0%) to the intermediate target lighting intensity value (e.g., 37.5%) over the limited fade time $T_{FADE\_LIMIT}$ (e.g., 90 seconds).

The load controller may calculate the intermediate target lighting intensity value $V_{TARGET\_INTER}$ in the message transmitted at 508 based on a present lighting intensity value $V_{PRES}$ (e.g., 0%) and a lighting intensity adjustment value $V_{ADJ}$ (e.g., 37.5%). The lighting intensity adjustment value $V_{ADJ}$ may be calculated as a function of the constant fade rate $r_{CON}$ and the limited fade time $T_{FADE\_LIMIT}$. For example, the load controller may calculate the lighting intensity adjustment value $V_{ADJ}$ (e.g., 37.5%). by dividing the entire fade time $T_{FADE}$ by the limited fade time $T_{FADE\_LIMIT}$ to determine the lighting intensity adjustment value $V_{ADJ}$ as a percentage of the entire fade time $T_{FADE}$. Accordingly, if the limited fade time $T_{FADE\_LIMIT}$ is 90 seconds and the total fade time $T_{FADE}$ is 240 seconds, the limited fade time $T_{FADE\_LIMIT}$ may be 37.5% of the entire fade time $T_{FADE}$. The load controller may similarly adjust the lighting intensity adjustment value $V_{ADJ}$ (e.g., 37.5%) to a portion of the total change in the lighting intensity (e.g., 100%) over the entire fade time $T_{FADE}$ to maintain the fade rate for the limited fade time $T_{FADE\_LIMIT}$. Though the intermediate lighting intensity target value $V_{TARGET\_INTER}$ is described with reference to a lighting intensity value, an intermediate target value may similarly be calculated for other load control parameters based on a present value of the load control parameter at the time of performing control and an adjustment value that is calculated to maintain the fade rate over the limited fade time $T_{FADE\_LIMIT}$.

The load controller may transmit the message at 508 that includes the intermediate target lighting intensity value $V_{TARGET\_INTER}$ for controlling the lighting intensity over the limited fade time $T_{FADE\_LIMIT}$. The load controller may wait for a transmission period $T_{TX}$ (e.g., 60 seconds) before transmitting another message at 510. The transmission period $T_{TX}$ may be shorter than the limited fade time $T_{FADE\_LIMIT}$ to allow for each message to be transmitted from the load controller and processed at the lighting control device to enable continuous control of the lighting intensity value over the commanded fade time $T_{FADE\_CMD}$ (e.g., without the lighting load maintaining a constant lighting intensity value after the expiration of the limited fade time $T_{FADE\_LIMIT}$ prior to a subsequent message being received and processed). For example, if the lighting load maintains a constant lighting intensity after the expiration of the limited fade time $T_{FADE\_LIMIT}$ prior to a subsequent message being received and processed, the intensity change may be visibly steppy (e.g., discontinuous) instead of smooth (e.g., continuous).

The load controller may determine a remaining fade time $T_{FADE\_REMAINING}$ of the commanded fade time $T_{FADE\_CMD}$ that remains after each transmission period $T_{TX}$ expires. For example, after transmission of the message at 508, the load controller may determine a remaining fade time $T_{FADE\_REMAINING}$ after the end of the transmission period $T_{TX}$_PERIOD (e.g., at 60 seconds). If the remaining fade time $T_{FADE\_REMAINING}$ is greater than the limited fade time $T_{FADE\_LIMIT}$, another intermediate target lighting intensity value $V_{TARGET\_INTER}$ may be calculated for being transmitted in the message at 510 to continue to maintain the fade rate over the commanded fade time $T_{FADE\_CMD}$. The load controller may calculate the intermediate target lighting intensity value $V_{TARGET\_INTER}$ that is included in the message transmitted at 510 based on the present lighting intensity value $V_{PRES}$ (e.g., 25%) at the end of the transmission period $T_{TX}$ and the lighting intensity adjustment value $V_{ADJ}$. Thus, the intermediate target lighting intensity value $V_{TARGET\_INTER}$ in the message transmitted at 510 may be set to 62.5%. The lighting control device may receive the message transmitted at 510 and control the lighting intensity of the corresponding lighting load from the present lighting intensity level $V_{PRES}$ towards the intermediate lighting intensity level $V_{TARGET\_INTER}$ over the limited fade time $T_{FADE\_LIMIT}$.

After transmission of the message at 510, the load controller may determine that the remaining fade time $T_{FADE\_REMAINING}$ at the end of the next transmission period $T_{TX}$ (e.g., at 120 seconds) is greater than the limited fade time $T_{FADE\_LIMIT}$ and calculate another intermediate target lighting intensity value $V_{TARGET\_INTER}$ for being transmitted in the message at 512. The load controller may calculate the intermediate target lighting intensity value $V_{TARGET\_INTER}$ in the message transmitted at 512 based on the present lighting intensity value $V_{PRES}$ (e.g., 50%) at the end of the transmission period $T_{TX}$ (e.g., at 120 seconds) and the lighting intensity adjustment value $V_{ADJ}$. Thus, the intermediate target lighting intensity value $V_{TARGET\_INTER}$ in the message transmitted at 512 may be set to 87.5%. The lighting control device may receive the message transmitted at 512 and control the lighting intensity of the corresponding lighting load from the present lighting intensity level $V_{PRES}$ towards the intermediate lighting intensity level $V_{TARGET\_INTER}$ over the limited fade time $T_{FADE\_LIMIT}$.

Prior to the transmission of another message at 514, the load controller may determine at the expiration of the transmission period $T_{TX}$ (e.g., at 180 seconds) that the remaining fade time $T_{FADE\_REMAINING}$ is less than the limited fade time $T_{FADE\_LIMIT}$. As such, the load controller may transmit a message at 514 that includes the remaining fade time $T_{FADE\_REMAINING}$ (e.g., 60 seconds) at the end of the transmission period $T_{TX}$ and the commanded target value $V_{TARGET}$ (e.g., 100%) to which the lighting intensity is to be controlled over the remaining fade time $T_{FADE\_REMAINING}$. The lighting control device may control the lighting intensity of the lighting load to the commanded target value $V_{TARGET}$ (e.g., 100%) over the remaining fade time $T_{FADE\_REMAINING}$. At 516, the lighting intensity may reach the commanded target value $V_{TARGET}$ (e.g., 100%) after the commanded fade time $T_{FADE\_CMD}$ (e.g., 4 minutes) has elapsed, while maintaining the constant fade rate, as described herein.

Figure 6:
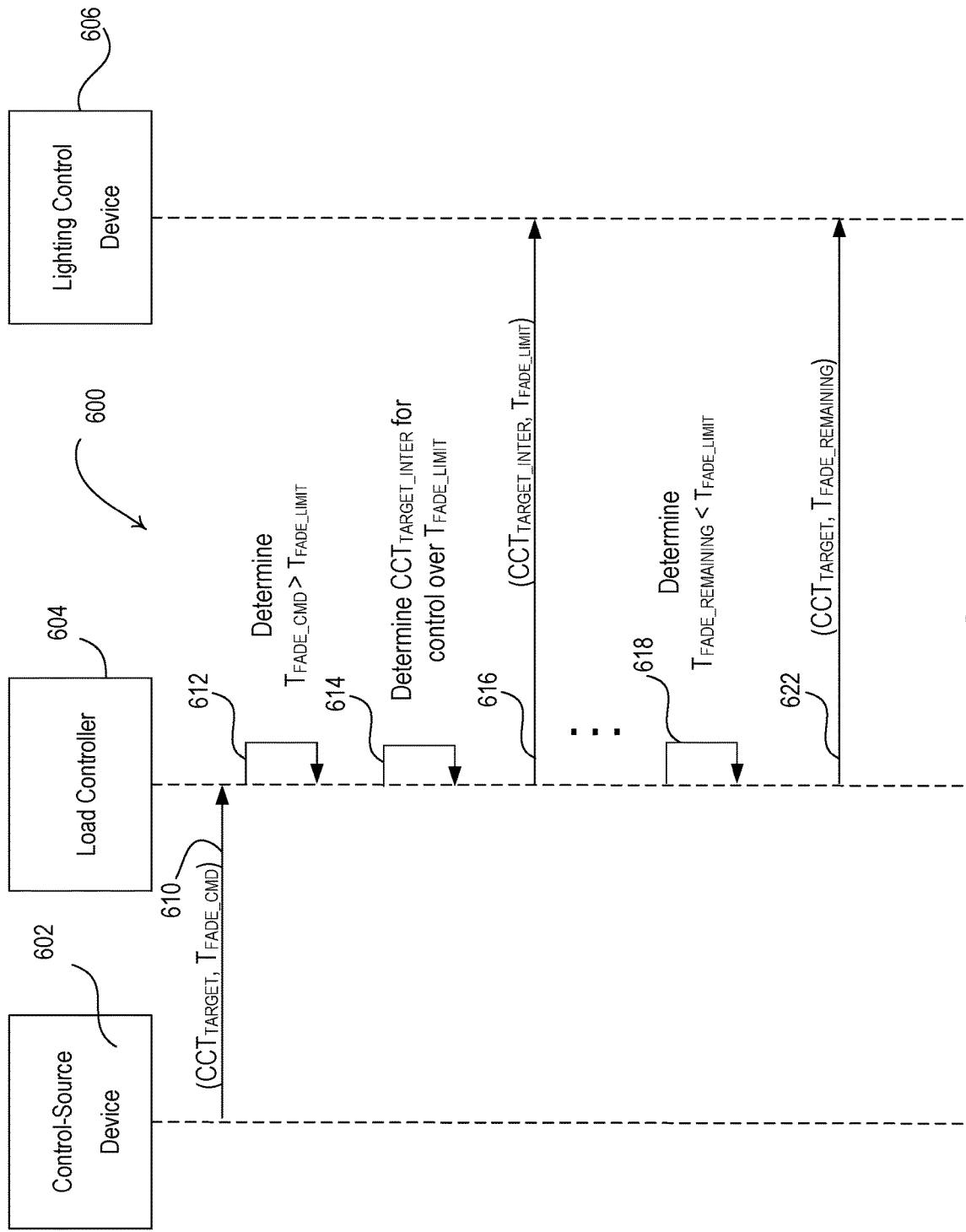
FIG. 6 is an example sequence diagram of a load control system for controlling a load control parameter using a limited fade time $T_{FADE\_LIMIT}$.

FIG. 6 is an example sequence diagram 600 of a load control system (e.g., the load control system 100) illustrating the transmission of messages for controlling a load control parameter using a limited fade time $T_{FADE\_LIMIT}$. The sequence diagram 600 may depict the transmission of messages communicated between an input device 602, a load controller 604 (e.g., the load controller 110 shown in FIG. 1), and a lighting control device 606 (e.g., the load control devices 122a, 122b shown in FIG. 1). Though the sequence diagrams 600 illustrates the lighting control device 606 and lighting control parameters being communicated in the messages between the control devices for controlling a lighting load via the lighting control device 606, other load control devices may be similarly implemented to control other load control parameters as described herein. Additionally, the input device 602 may represent a control device from which messages may have originated, or through which the messages may be communicated, prior to being received by the load controller 604. For example, the input device 602 may comprise a control device in the load control system from which messages may be transmitted, such as the network computing device 164, the remote control device 150, the wired sensor 166, and/or another device in the load control system 100 shown in FIG. 1. In another example, the input device 602 may represent a wired/wireless processor, such as the wired/wireless processor 140 shown in FIG. 1, from which messages may have originated or through which messages may be communicated from a control device.

The input device 602 may transmit a message at 610 to the load controller 604 comprising lighting control parameters. The lighting control parameters may include a target color temperature value $CCT_{TARGET}$ and/or a commanded fade time $T_{FADE\_CMD}$ over which the color temperature of a lighting load is to be controlled to the target color temperature value $CCT_{TARGET}$ (e.g., at a constant fade rate $r_{CON}$). At 612, the load controller 604 may determine that the commanded fade time $T_{FADE\_CMD}$ over which the lighting intensity is to be continuously controlled is longer than a limited fade time $T_{FADE\_LIMIT}$ for being able to control the fade time for the lighting load via a single command. For example, the limited fade time $T_{FADE\_LIMIT}$ may be a maximum period of time supported for controlling a load control parameter at the lighting control device 606 in a single command transmitted in a message and/or a maximum period of time that the load controller 604 is preconfigured to transmit as a fade time for controlling a load control parameter. The limited fade time $T_{FADE\_LIMIT}$ may be a maximum period of time for a single lighting parameter change. For example, the load controller and/or the load control device may be configured to send/receive a maximum period of time for changing a single lighting parameter change. The load controller may be configured to transmit a series of messages comprising the limited fade time $T_{FADE\_LIMIT}$ to the load control device. At 614, the load controller 604 may determine an intermediate target color temperature value $CCT_{TARGET\_INTER}$ for controlling the load control parameter over the limited time $T_{FADE\_LIMIT}$. As described herein, the load controller may calculate the intermediate target color temperature value $CCT_{TARGET\_INTER}$ based on a present color temperature value $CCT_{PRES}$ and a lighting intensity adjustment value $V_{ADJ}$. The lighting intensity adjustment value $V_{ADJ}$ may be calculated as a function of the commanded fade time $T_{FADE\_CMD}$ and the limited fade time $T_{FADE\_LIMIT}$ to maintain the same fade rate for the color temperature over the commanded fade time $T_{FADE\_CMD}$ during the limited fade time $T_{FADE\_LIMIT}$.

The load controller 604 may transmit a message 616 to the lighting control device 606 that includes the intermediate target color temperature value $CCT_{TARGET\_INTER}$ with the limited fade time $T_{FADE\_LIMIT}$. The lighting control device 606 may control the color temperature of the corresponding lighting load to the intermediate target color temperature value $CCT_{TARGET\_INTER}$ at the constant fade rate $r_{CON}$.

The load controller 604 may continue to compare a remaining fade time $T_{FADE\_REMAINING}$ of the commanded fade time $T_{FADE\_CMD}$ to the limited fade time $T_{FADE\_LIMIT}$ to determine whether to transmit another intermediate target color temperature value $CCT_{TARGET\_INTER}$ for controlling the color temperature value of the lighting load. The load controller 604 may transmit the intermediate target color temperature value $CCT_{TARGET\_INTER}$ when the remaining fade time $T_{FADE\_REMAINING}$ of the commanded fade time $T_{FADE\_CMD}$ is longer than the limited fade time $T_{FADE\_LIMIT}$. As described herein, the load controller 604 may wait for the length of a transmission period $T_{TX}$ before transmitting another message. The transmission period $T_{TX}$ may be shorter than limited fade time $T_{FADE\_LIMIT}$ to allow for each message to be transmitted from the load controller 604 and processed at the lighting control device 606 to enable continuous adjustment of the lighting intensity value over the commanded fade time $T_{FADE\_CMD}$ (e.g., without the lighting load maintaining a constant lighting intensity value for prolonged periods of time due to expiration of the limited fade time $T_{FADE\_LIMIT}$ prior to a subsequent message being received and processed).

At 618, the load controller 604 may determine that the remaining fade time $T_{FADE\_REMAINING}$ of the commanded fade time $T_{FADE\_CMD}$ is shorter than the limited fade time $T_{FADE\_LIMIT}$. The load controller 604 may transmit a message 622 that includes the target color temperature value $CCT_{TARGET}$ with the remaining fade time $T_{FADE\_REMAINING}$ to the lighting control device 606. The lighting control device 606 may control the color temperature value to the target color temperature value $CCT_{TARGET}$ over the remaining fade time $T_{FADE\_REMAINING}$.

Figure 7:
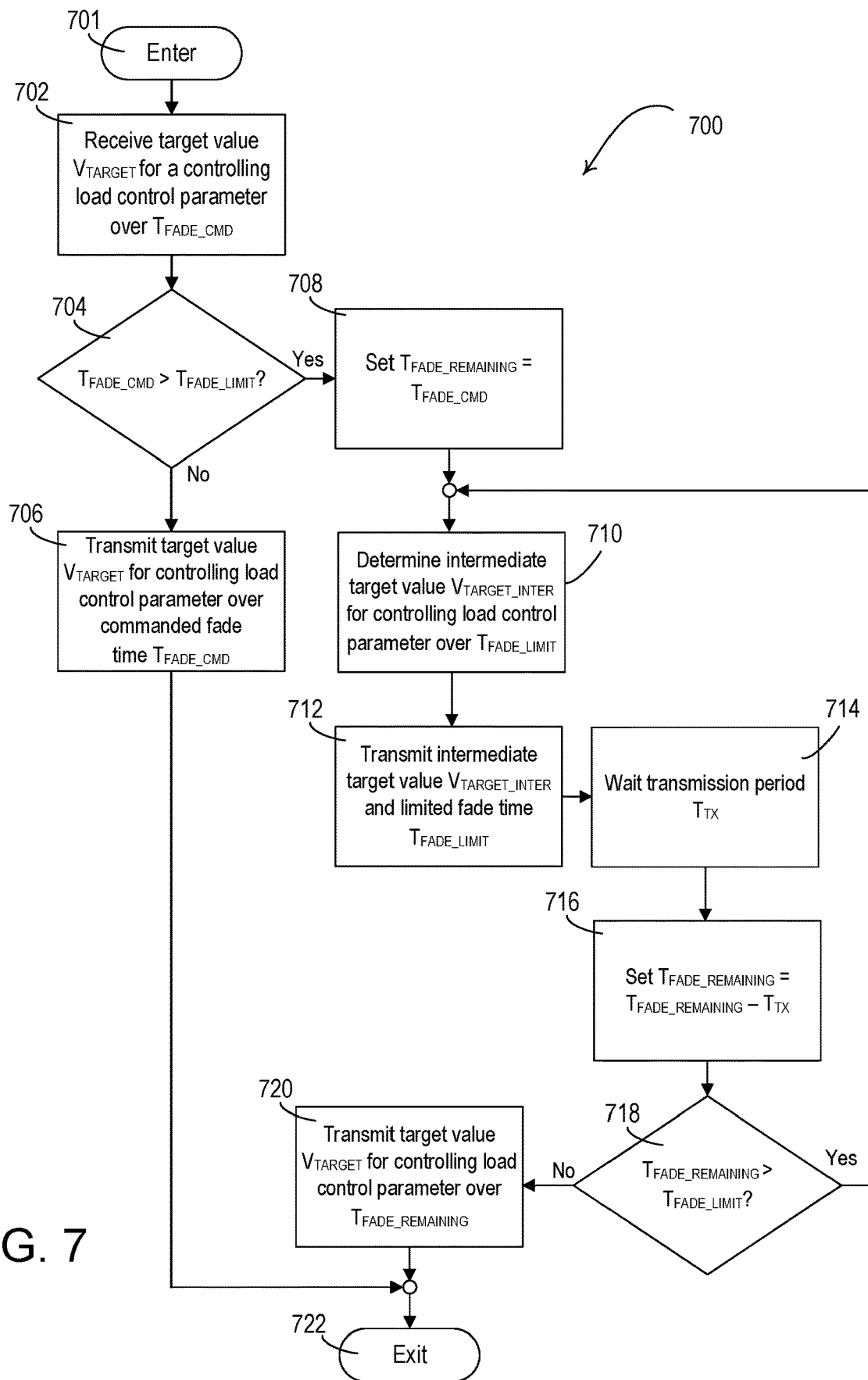
FIG. 7 is an example flowchart for controlling a load control parameter using a limited fade time $T_{FADE\_LIMIT}$.

FIG. 7 is an example flowchart of a control procedure 700 for controlling a load control parameter using a limited fade time $T_{FADE\_LIMIT}$. The procedure 700 may be performed by a load controller, such as the load controller 110 shown in FIG. 1, or another device in the load control system. For example, the procedure 700 may be performed by a wired/wireless processor, such as the wired/wireless processor 140 shown in FIG. 1, or another local or remote computing device. Though the procedure 700 may be described herein as being performed by a single device, such as a load controller, the procedure 700 may be distributed across multiple devices.

The load controller may enter the procedure 700 at 701. For example, the procedure 700 may begin at 701 in response to receiving a message, periodically, and/or at preprogrammed times). At 702, the load controller may receive a commanded target value $V_{TARGET}$ for controlling a load control parameter over a commanded fade time $T_{FADE\_CMD}$ (e.g., at a constant fade rate $r_{CON}$). For example, the load control parameter may be a lighting control parameter (e.g., lighting intensity, color temperature, saturation), though other load control parameters may be similarly controlled.

At 704, the load controller may determine whether the commanded fade time $T_{FADE\_CMD}$ is greater than a limited fade time $T_{FADE\_LIMIT}$ for being able to control the fade time for the lighting load via a single command. For example, the limited fade time $T_{FADE\_LIMIT}$ may be a maximum period of time supported for controlling a load control parameter at the lighting control device in a single command in a transmitted message and/or a maximum period of time the load controller is preconfigured to transmit as a fade time for controlling a load control parameter. If the commanded fade time $T_{FADE\_CMD}$ is shorter than the limited fade time $T_{FADE\_LIMIT}$, the load controller may transmit the commanded target value $V_{TARGET}$ at 706 for controlling the load control parameter over the commanded fade time $T_{FADE\_CMD}$ and exit the procedure 700 at 722.

If the commanded fade time $T_{FADE\_CMD}$ is determined, at 704, to be longer than the limited fade time $T_{FADE\_LIMIT}$, the load controller may set a remaining fade time $T_{FADE\_REMAINING}$ to be equal to the commanded fade time $T_{FADE\_CMD}$ at 708. The remaining fade time $T_{FADE\_REMAINING}$ may be used to track the amount of time remaining over the commanded fade time $T_{FADE\_CMD}$.

At 710, the load controller may determine an intermediate target value $V_{TARGET\_INTER}$ for controlling the load control parameter over the limited fade time $T_{FADE\_LIMIT}$. The load controller may calculate the intermediate target value $V_{TARGET\_UPDATED}$ for controlling a load control parameter based on a present load control parameter value $V_{PRES}$ at the time of control and a lighting intensity adjustment value $V_{ADJ}$. The lighting intensity adjustment value $V_{ADJ}$ may be calculated as a function of the constant fade rate $r_{CON}$ and the limited fade time $T_{FADE\_LIMIT}$ to maintain the constant fade rate $r_{CON}$ for the load control parameter over the commanded fade time $T_{FADE\_CMD}$. The load controller may determine the lighting intensity adjustment value $V_{ADJ}$ by multiplying the constant fade rate and the limited fade time $T_{FADE\_LIMIT}$. The load controller may determine the lighting intensity adjustment value $V_{ADJ}$ by dividing the entire fade time $T_{FADE}$ by the limited fade time $T_{FADE}$ to determine the limited fade time $T_{FADE\_LIMIT}$ as a percentage of the entire fade time $T_{FADE}$. The load controller may similarly adjust the fade rate increase value $V_{FADE\_RATE}$ to a portion of the total change in the load control parameter when being controlled to the commanded target value $V_{TARGET}$ over the entire fade time $T_{FADE}$ to maintain the fade rate for the limited fade time $T_{FADE\_LIMIT}$.

At 712, the load controller may transmit the intermediate target value $V_{TARGET\_INTER}$ for controlling the load control parameter. The intermediate target value $V_{TARGET\_INTER}$ may be transmitted with the limited fade time $T_{FADE\_LIMIT}$. In another example, the load controller may transmit the intermediate target value $V_{TARGET\_INTER}$ without the limited fade time $T_{FADE\_LIMIT}$ and the load control device receiving the intermediate target value $V_{TARGET\_INTER}$ that is different than the commanded target value $V_{TARGET}$ may infer that the electrical load is to be controlled over the limited fade time $T_{FADE\_LIMIT}$.

At 714, the load controller may wait for the length of the transmission period $T_{TX}$. For example, the transmission period $T_{TX}$ may be a period of time the load controller waits between sending messages. The transmission period $T_{TX}$ may be shorter than the limited fade time $T_{FADE\_LIMIT}$ to allow for each message to be transmitted from the load controller and processed at the load control devices to enable continuous control of the load control parameter over the entire fade time $T_{FADE}$ (e.g., without the lighting load maintaining a constant value for prolonged periods of time due to expiration of the limited fade time $T_{FADE\_LIMIT}$ prior to a subsequent message being received and processed).

At 716, the load controller may set the remaining fade time $T_{FADE\_REMAINING}$. For example, the remaining fade time $T_{FADE\_REMAINING}$ may be set equal to the previous remaining fade time $T_{FADE\_REMAINING}$ minus the transmission period $T_{TX}$. The remaining fade time $T_{FADE\_REMAINING}$ may be set to the time at which a future transmission is to be sent after the expiration of a transmission period $T_{TX}$ to determine the target value for controlling the load control parameter.

At 718, if the remaining fade time $T_{FADE\_REMAINING}$ is longer than the limited fade time $T_{FADE\_LIMIT}$, the load controller may return to 710 to determine another intermediate target value $V_{TARGET\_INTER}$ for controlling the load control parameter over the limited fade time $T_{FADE\_LIMIT}$.

If, at 718, the remaining fade time $T_{FADE\_REMAINING}$ is determined to be shorter than the limited fade time $T_{FADE\_LIMIT}$, the load controller may transmit the commanded target value $V_{TARGET}$ for controlling the load control parameter over the remaining fade time $T_{FADE\_REMAINING}$. The load control device may then control the electrical load to the commanded target value $V_{TARGET}$ over the remaining fade time $T_{FADE\_REMAINING}$ and continue to control the load control parameter according to the constant fade rate $r_{CON}$.

Figure 8:
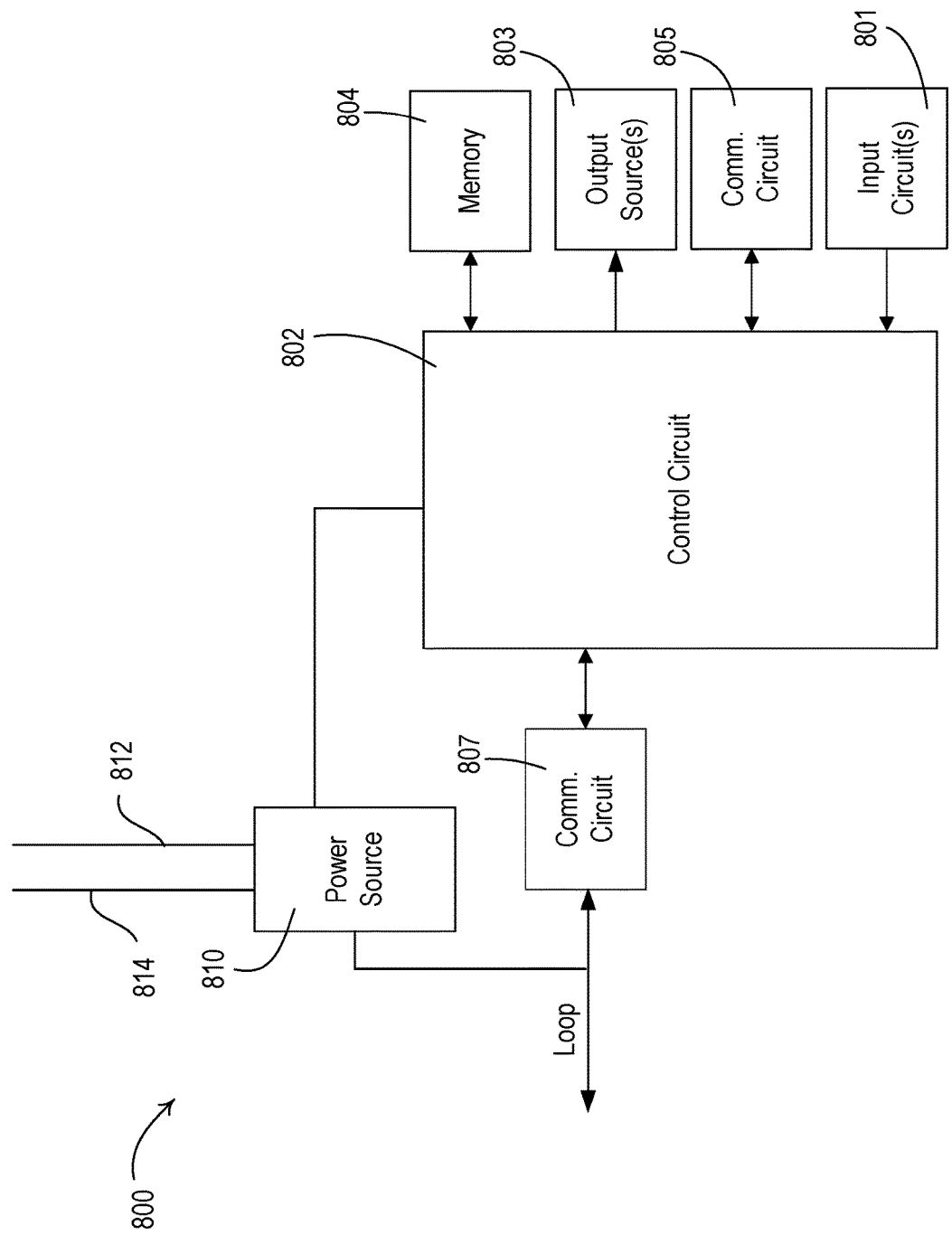
FIG. 8 is a block diagram of an example load controller.

FIG. 8 is a block diagram illustrating an example load controller 800, such as the load controller 110 shown in FIG. 1, for example. The load controller 800 may include a control circuit 802 for controlling the functionality of the controller 800, as described herein. The control circuit 802 may include one or more general purpose processors, special purpose processors, conventional processors, digital signal processors (DSPs), microprocessors, integrated circuits, a programmable logic device (PLD), application specific integrated circuits (ASICs), or the like. The control circuit 802 may perform signal coding, data processing, power control, input/output processing, or any other functionality that enables the controller 800 to perform as described herein.

The control circuit 802 may store information in and/or retrieve information from the memory 804. The memory 804 may include a non-removable memory and/or a removable memory, as described herein. For example, the memory 804 may maintain a registry of associated input devices and/or load control devices, zone identifiers and the devices associated therewith, and/or other information described herein. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 804 may be implemented as an external integrated circuit (IC) or as an internal circuit of the control circuit 802.

The memory 804 may comprise a computer-readable storage media or machine-readable storage media that maintains a device dataset of associated device identifiers, network information, and/or computer-executable instructions for performing as described herein. For example, the memory 804 may comprise computer-executable instructions or machine-readable instructions that include one or more portions of the procedures described herein. For example, the computer-executable instructions or machine-readable instructions may, when executed, cause the control circuit 802 to perform one or more of the procedures 400, 450, and/or 700. The control circuit 802 may access the instructions from memory 804 for being executed to cause the control circuit 802 to operate as described herein, or to operate one or more other devices as described herein. Further, the memory 804 may have stored thereon one or more settings and/or control parameters associated with the device 800.

The control circuit 802 may be in communication with one or more output source(s) 803 (e.g., one or more LED indicators) for providing indications to a user. The control circuit 802 may be in communication with an input circuit 801 (e.g., one or more buttons) that may be actuated by a user to communicate user selections to the control circuit 802. For example, the input circuit 801 may be or include an actuator. For example, the input circuit 801 may be actuated to put the control circuit 802 in an association mode and/or communicate association messages from the load controller 800.

A load controller 800 may receive power via the hot connection 812 and the neutral connection 814 and may provide an amount of power to other devices in the load control system. For example, the hot connection 812 and the neutral connection 814 may be connected to the power line 160 on which power is provided from the AC power source 102 shown in FIG. 1.

The load controller 800 may comprise a communication circuit 805 for communicating with other devices in the load control system. For example, the communication circuit 805 may be capable of communicating via a wired communication link, such as the wired communication link 104 illustrated in FIG. 1. The load controller 800 may include one or more wired communication circuits 807 for communicating with load control devices via one or more wired communication links. The load controller 800 may comprise a communication circuit for each wired communication link on which the load controller is capable of communicating, or a single communication circuit may be configured to communicate on each of the wired communication links. The wired communication circuit 807 may transmit and/or receive information via wired communication links (e.g., the wired communication links described herein). The communication circuit 807 may include a transmitter, a receiver, a transceiver, or other circuit capable of performing wired communications on a wired communication link. For example, the wired communication link may be a DALI communication link, as described herein.

The load controller 800 may be powered by a power source 810. The power source 810 may include an AC power supply or DC power supply, for example. The power source 810 may generate a supply voltage for powering the load controller 800. The power source 810 may convert the AC power from the AC power source that is received via hot connection 812 and neutral connection 814 to loop power for each wired communication link.

Figure 9:
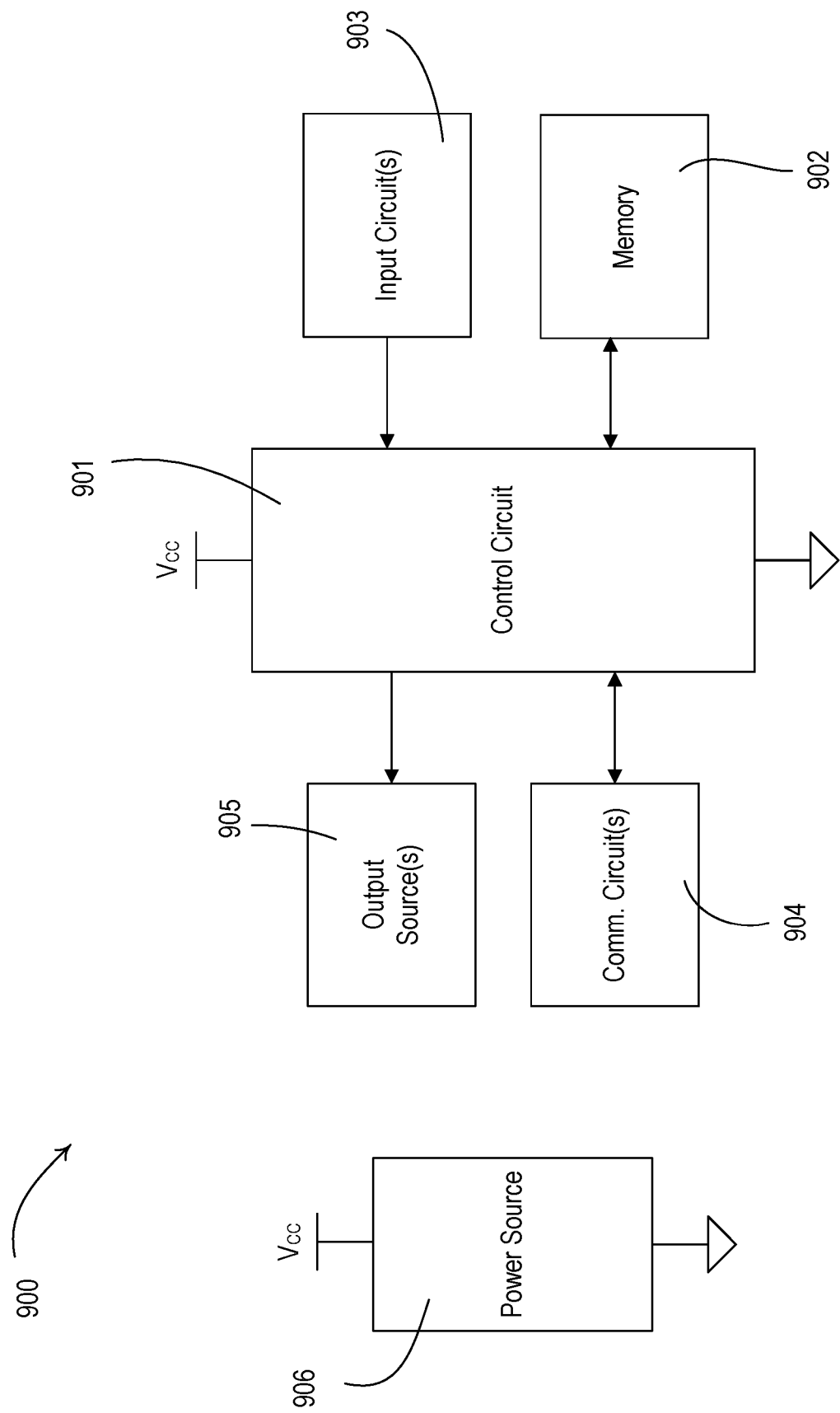
FIG. 9 is a block diagram illustrating an example of a device capable of processing and/or communication in the load control system of FIG. 1A.

FIG. 9 is a block diagram illustrating an example of a device 900 capable of processing and/or communication in a load control system, such as the load control system 100 of FIG. 1A. In an example, the device 900 may be a control device capable of transmitting or receiving messages. The control device may be in an input device, such as a sensor device (e.g., an occupancy sensor or another sensor device), a visible light sensor (e.g., the sensor device 166), a remote control device, or another input device capable of transmitting messages to load control devices or other devices in the load control system 100. The device 900 may be a computing device, such as a mobile device, a remote computing device, a processing device, a central computing device, or another computing device in the load control system 100.

The device 900 may include a control circuit 901 for controlling the functionality of the device 900. The control circuit 901 may include one or more general purpose processors, special purpose processors, conventional processors, digital signal processors (DSPs), microprocessors, integrated circuits, a programmable logic device (PLD), application specific integrated circuits (ASICs), or the like. The control circuit 901 may perform signal coding, data processing, image processing, power control, input/output processing, or any other functionality that enables the device 900 to perform as one of the devices of the load control system (e.g., load control system 100) described herein.

The control circuit 901 may be communicatively coupled to a memory 902 to store information in and/or retrieve information from the memory 902. The memory 902 may comprise a computer-readable storage media or machine-readable storage media that maintains a device dataset of associated device identifiers, network information, and/or computer-executable instructions for performing as described herein. For example, the memory 902 may comprise computer-executable instructions or machine-readable instructions that include one or more portions of the procedures described herein. For example, the computer-executable instructions or machine-readable instructions may, when executed, cause the control circuit 901 to perform one or more of the procedures 400, 450, and/or 700. The control circuit 901 may access the instructions from memory 902 for being executed to cause the control circuit 901 to operate as described herein, or to operate one or more other devices as described herein. Further, the memory 902 may have stored thereon one or more settings and/or control parameters associated with the device 900.

The memory 902 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 902 may be implemented as an external integrated circuit (IC) or as an internal circuit of the control circuit 901.

The device 900 may include one or more communication circuits 904 that are in communication with the control circuit 901 for sending and/or receiving information as described herein. The communication circuit 904 may perform wireless and/or wired communications. The communication circuit 904 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 904 may be configured to communicate via power lines (e.g., the power lines from which the device 900 receives power) using a power line carrier (PLC) communication technique. The communication circuit 904 may be a wireless communication circuit including one or more RF or infrared (IR) transmitters, receivers, transceivers, and/or other communication circuits capable of performing wireless communications.

Though a single communication circuit 904 may be illustrated, multiple communication circuits may be implemented in the device 900. The device 900 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, and the second communication circuit may be configured to communicate via a second wireless communication link (e.g., a short-range or direct wireless communication link) using a second wireless protocol (e.g., a short-range wireless communication protocol).

One of the communication circuits 904 may comprise a beacon transmitting and/or receiving circuit capable of transmitting and/or receiving beacon messages via a short-range RF signal. The control circuit 901 may communicate with beacon transmitting circuit (e.g., a short-range communication circuit) to transmit beacon messages. The beacon transmitting circuit may communicate beacons via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacons are transmitted (e.g., the beacon transmitting circuit is configured to transmit and receive beacon messages). The information received at the beacon transmitting circuit may be provided to the control circuit 901.

The control circuit 901 may be in communication with one or more input circuits 903 from which inputs may be received. The input circuits 903 may be included in a user interface for receiving inputs from the user. For example, the input circuits 903 may include an actuator (e.g., a momentary switch that may be actuated by one or more physical buttons) that may be actuated by a user to communicate user input or selections to the control circuit 901. In response to an actuation of the actuator, the control circuit 901 may enter an association mode, transmit association messages from the device 900 via the communication circuits 904, and/or receive other information (e.g., control instructions for performing control of an electrical load). In response to an actuation of the actuator, the control circuit may be configured to perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 901 of the device 900 may enter the association mode, transmit an association message, transmit control instructions, or perform other functionality in response to an actuation or input from the user on the touch sensitive surface.

The input circuits 903 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 900). The control circuit 901 may receive information from the one or more input circuits 903 and process the information for performing functions as described herein.

The control circuit 901 may be in communication with one or more output sources 905. The output sources 905 may include one or more indicators (e.g., visible indicators, such as LEDs) for providing indications (e.g., feedback) to a user. The output sources 905 may include a display (e.g., a visible display) for providing information (e.g., feedback) to a user. The control circuit 901 and/or the display may generate a graphical user interface (GUI) generated via software for being displayed on the device 900 (e.g., on the display of the device 900).

The user interface of the device 900 may combine features of the input circuits 903 and the output sources 905. For example, the user interface may have buttons that actuate the actuators of the input circuits 903 and may have indicators (e.g., visible indicators) that may be illuminated by the light sources of the output sources 905. In another example, the display and the control circuit 901 may be in two-way communication, as the display may display information to the user and include a touch screen capable of receiving information from a user. The information received via the touch screen may be capable of providing the indicated information received from the touch screen as information to the control circuit 901 for performing functions or control.

Each of the hardware circuits within the device 900 may be powered by a power source 906. The power source 906 may include a power supply configured to receive power from an alternating-current (AC) power supply or direct-current (DC) power supply, for example. In addition, the power source 906 may comprise one or more batteries. The power source 906 may produce a supply voltage $V_{CC}$ for powering the hardware within the device 900.

Figure 10:
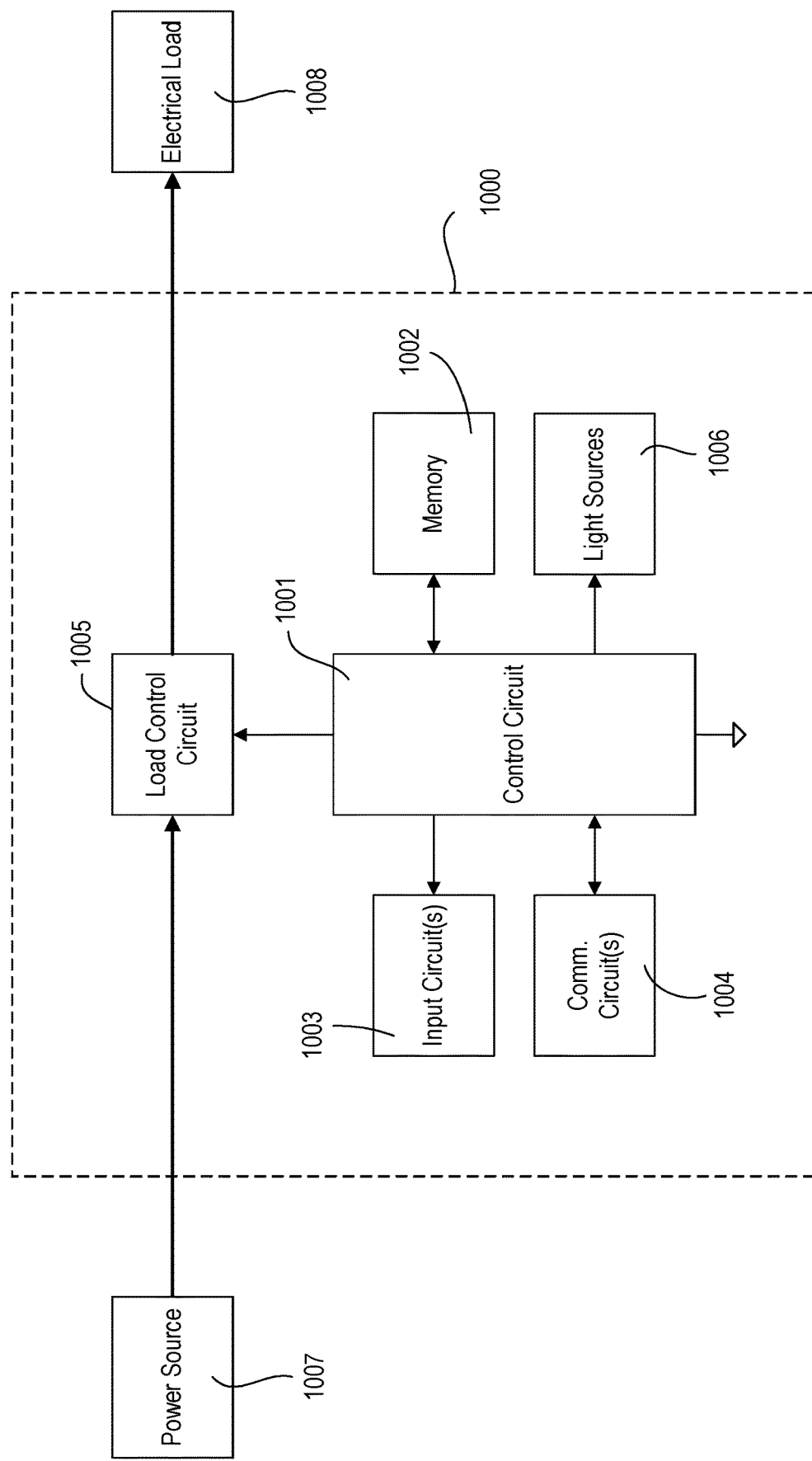
FIG. 10 is a block diagram illustrating an example load control device.

FIG. 10 is a block diagram illustrating an example load control device 1000. The load control device 1000 may be a lighting control device (e.g., the lighting control devices or LED drivers for controlling the electrical loads 124a, 124b), a motorized window treatment, a plug-in load control device, a temperature control device, a dimmer switch, a speaker, an electronic switch, an electronic ballast for lamps, and/or another load control device.

The load control device 1000 may include a control circuit 1001 for controlling the functionality of the load control device 1000. The control circuit 1001 may include one or more general purpose processors, special purpose processors, conventional processors, digital signal processors (DSPs), microprocessors, integrated circuits, a programmable logic device (PLD), application specific integrated circuits (ASICs), or the like. The control circuit 1001 may perform signal coding, data processing, image processing, power control, input/output processing, or any other functionality that enables the load control device 1000 to perform as one of the devices of the load control system (e.g., load control system 100) described herein.

The load control device 1000 may include a load control circuit 1005 that may be electrically coupled in series between a power source 1007 (e.g., an AC power source and/or a DC power source) and an electrical load 1008. The control circuit 1001 may be configured to control the load control circuit 1005 for controlling the electrical load 1008, for example, in response to received instructions. The electrical load 1008 may include a lighting load, a motor load (e.g., for a ceiling fan and/or exhaust fan), an electric motor for controlling a motorized window treatment, a component of a heating, ventilation, and cooling (HVAC) system, a speaker, or any other type of electrical load. The electrical load may 1008 be included in or external to the load control device 1000. For example, the load control device 1000 may be a dimmer switch or an LED driver capable of controlling an external lighting load. The electrical load 1008 may be integral with the load control device 1000. For example, the load control device 1000 may be included in LEDs of a controllable light source, a motor of a motor drive unit, or a speaker in a controllable audio device.

The control circuit 1001 may be communicatively coupled to a memory 1002 to store information in and/or retrieve information from the memory 1002. The memory 1002 may comprise a computer-readable storage media or machine-readable storage media that maintains a device dataset of associated device identifiers, network information, and/or computer-executable instructions for performing as described herein. For example, the memory 182 may comprise computer-executable instructions or machine-readable instructions that include one or more portions of the procedures described herein. The memory 1002 may have stored thereon one or more settings and/or control parameters associated with the device 1000. For example, the memory 1002 may have stored thereon one or more associations between control parameters and respective settings. The settings may be updated as described herein. The memory 1002 may store one or more parameters and/or values for being controlled over different fade times in response to computer-executable instructions or messages as described herein.

The control circuit 1001 may access the instructions from memory 1002 for being executed to cause the control circuit 1001 to operate as described herein, or to operate one or more devices as described herein. For example, the memory 1002 may maintain a registry of associated input devices, a switchleg index associated with the load control device 1000 for enabling control, a group identifier associated with the load control device 1000 on a wired communication link for enabling control, and/or a zone identifier associated with the load control device 1000 for enabling control. The memory 1002 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 1002 may be implemented as an external integrated circuit (IC) or as an internal circuit of the control circuit 1001. The load control circuit 1005 may receive instructions from the control circuit 1001 and may control an electrical load 1008 based on the received instructions. The load control circuit 1005 may send status feedback to the control circuit 1001 regarding the status of the electrical load 1008. The electrical load 1008 may include any type of electrical load, such as a lighting load (e.g., LED, fluorescent lamp, etc.).

The load control device 1000 may include one or more communication circuits 1004 that are in communication with the control circuit 1001 for sending and/or receiving information as described herein. The communication circuit 1004 may perform wireless and/or wired communications. The communication circuit 1004 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 1004 may be configured to communicate via power lines (e.g., the power lines from which the load control device 1000 receives power) using a power line carrier (PLC) communication technique. The communication circuit 1004 may be a wireless communication circuit including one or more RF or IR transmitters, receivers, transceivers, or other communication circuits capable of performing wireless communications. The communication circuit 1004 may receive messages comprising parameters (e.g., as described herein) for controlling the electrical load 1008 over a given amount of time or at a given rate.

The load control circuit 1005 may receive power on the same link on which communications are received, or on a different link. The load control device 1000 may receive power from a wired communication link, which may be a wired power/communication link, a DC bus voltage, an AC mains line, and/or the like. The control circuit 1001 may be in communication with the load control circuit 1005 for controlling the amount of power provided to an electrical load 1008.

Though a single communication circuit 1004 may be illustrated, multiple communication circuits may be implemented in the load control device 1000. The load control device 1000 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol), and the second communication circuit may be configured to communicate via a second wireless communication link (e.g., a short-range or direct wireless communication link) using a second wireless protocol (e.g., a short-range wireless communication protocol).

One of the communication circuits 1004 may comprise a beacon transmitting and/or receiving circuit capable of transmitting and/or receiving beacon messages via a short-range RF signal. A control circuit 1001 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 1001.

The control circuit 1001 may be in communication with one or more input circuits 1003 from which inputs may be received. The input circuits 1003 may be included in a user interface for receiving inputs from the user. For example, the input circuits 1003 may include an actuator (e.g., a momentary switch that may be actuated by one or more physical buttons) that may be actuated by a user to communicate user input or selections to the control circuit 1001. In response to an actuation of the actuator, the control circuit 1001 may enter an association mode, transmit association messages from the load control device 1000 via the communication circuits 1004, and/or receive other information. In response to an actuation of the actuator may perform control by controlling the load control circuit 1005 to control the electrical load 1008, and/or by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 1001 of the load control device 1000 may enter the association mode, transmit an association message, control the load control circuit 1005, transmit control instructions, or perform other functionality in response to an actuation or input from the user on the touch sensitive surface.

The input circuits 1003 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 1000). The control circuit 1001 may receive information from the one or more input circuits 1003 and process the information for performing functions as described herein.

The control circuit 1001 may illuminate a light sources 1006 (e.g., LEDs) to provide feedback to a user. The control circuit 1001 may be operable to illuminate the light sources 1006 different colors. The light sources 1006 may be illuminated by, for example, one or more light-emitting diodes (LEDs).

Although features and elements are described herein in particular combinations, each feature or element can be used alone or in any combination with the other features and elements. The methods described herein may be implemented in a computer program, software, instructions, or firmware stored on one or more non-transitory computer-readable media for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A load controller comprising:
   a communication circuit configured to communicate messages configured to control an electrical load; and
   a control circuit configured to:
   identify a plurality of load control parameters that each have a different fade time for performing control of the electrical load;
   determine that a remaining fade time for a first load control parameter of the plurality of load control parameters is longer than a remaining fade time for a second load control parameter of the plurality of load control parameters;
   calculate an updated target value for controlling the first load control parameter during the remaining fade time for the second load control parameter; and
   transmit, via the communication circuit, a message configured to control the first load control parameter and the second load control parameter during the remaining fade time for the second load control parameter, wherein the message comprises the updated target value for controlling the first load control parameter and a target value for controlling the second load control parameter.

2. The load controller of claim 1, wherein the control circuit is configured to determine the updated target value for controlling the first load control parameter to approximate a target fade curve of the first load control parameter, wherein the target fade curve of the first load control parameter follows a commanded fade rate, the commanded fade rate corresponding to controlling the first load control parameter toward the first target value over the first fade time.

3. The load controller of claim 1, wherein the first load control parameter and the second load control parameter are lighting control parameters for controlling at least one lighting load.

4. The load controller of claim 3, wherein the first load control parameter and the second load control parameter each comprise a different lighting control parameter selected from a group comprising a lighting intensity and a color temperature.

5. Non-transitory computer readable media having instructions stored thereon that, when executed by a control circuit, cause the control circuit to:
   identify a plurality of load control parameters that each have a different fade time for performing control of an electrical load;
   determine that a remaining fade time for a first load control parameter of the plurality of load control parameters is longer than a remaining fade time for a second load control parameter of the plurality of load control parameters;

calculate an updated target value for controlling the first load control parameter during the remaining fade time for the second load control parameter; and transmit, via a communication circuit, a message configured to control the first load control parameter and the second load control parameter during the remaining fade time for the second load control parameter, wherein the message comprises the updated target value for controlling the first load control parameter and a target value for controlling the second load control parameter.

6. The non-transitory computer readable media of claim 5, wherein the instructions, when executed by the control circuit, further cause the control circuit to determine the updated target value for controlling the first load control parameter to approximate a target fade curve of the first load control parameter, wherein the target fade curve of the first load control parameter follows a commanded fade rate, the commanded fade rate corresponding to controlling the first load control parameter toward the first target value over the first fade time.

7. The non-transitory computer readable media of claim 5, wherein the first load control parameter and the second load control parameter are lighting control parameters for controlling at least one lighting load, and wherein the first load control parameter and the second load control parameter each comprise a different lighting control parameter selected from a group comprising a lighting intensity and a color temperature.

8. A method comprising:
identifying a plurality of load control parameters that each have a different fade time for performing control of an electrical load;
determining that a remaining fade time for a first load control parameter of the plurality of load control parameters is longer than a remaining fade time for a second load control parameter of the plurality of load control parameters;
calculating an updated target value for controlling the first load control parameter during the remaining fade time for the second load control parameter; and
transmitting, via a communication circuit, a message configured to control the first load control parameter and the second load control parameter during the remaining fade time for the second load control parameter, wherein the message comprises the updated target value for controlling the first load control parameter and a target value for controlling the second load control parameter.

9. The method of claim 8, further comprising determining the updated target value for controlling the first load control parameter to approximate a target fade curve of the first load control parameter, wherein the target fade curve of the first load control parameter follows a commanded fade rate, the commanded fade rate corresponding to controlling the first load control parameter toward the first target value over the first fade time.

10. The method of claim 8, wherein the first load control parameter and the second load control parameter are lighting control parameters for controlling at least one lighting load, and wherein the first load control parameter and the second load control parameter each comprise a different lighting control parameter selected from a group comprising a lighting intensity and a color temperature.

11. A load controller comprising:
a communication circuit configured to communicate messages configured to control an electrical load; and a control circuit configured to:
receive a target value of a parameter for controlling the electrical load and a fade time over which the parameter is to be controlled, the parameter to be controlled to the target value over the fade time at a constant fade rate;
determine that the fade time is longer than a limited fade time;
determine an intermediate target value for controlling the parameter over the limited fade time, wherein the intermediate target value is used to control the electrical load at the constant fade rate over the limited fade time; and
transmit, via the communication circuit, the intermediate target value for controlling the parameter over the limited fade time.

12. The load controller of claim 11, wherein the intermediate target value is a first intermediate target value and wherein the control circuit is further configured to:
wait for a length of a transmission period;
determine that a remaining fade time after the transmission period is longer than the limited fade time;
determine a second intermediate target value for controlling the parameter over the limited fade time; and
transmit, via the communication circuit, the second intermediate target value.

13. The load controller of claim 12, wherein the control circuit is further configured to:
wait for a length of a second transmission period;
determine that the remaining fade time after the second transmission period is shorter than the limited fade time; and
transmit, via the communication circuit, the target value of the parameter for controlling the electrical load and the remaining fade time.

14. The load controller of claim 11, wherein the control circuit is further configured to:
calculate the intermediate target value for controlling the parameter based on a present value of the parameter and a lighting intensity adjustment value.

15. The load controller of claim 11, wherein the parameter is a parameter for controlling at least one lighting load.

16. The load controller of claim 15, wherein the parameter is selected from a group comprising a lighting intensity and a color temperature.

17. A method comprising:
receiving a target value of a parameter for controlling an electrical load and a fade time over which the parameter is to be controlled, the parameter to be controlled to the target value over the fade time at a constant fade rate;
determining that the fade time is longer than a limited fade time;
determining an intermediate target value for controlling the parameter over the limited fade time, wherein the intermediate target value is used to control the electrical load at the constant fade rate over the limited fade time; and
transmitting, via a communication circuit, the intermediate target value for controlling the parameter over the limited fade time.

18. The method of claim 17, wherein the intermediate target value is a first intermediate target value, and wherein the method further comprises:
waiting for a length of a transmission period;
determining that a remaining fade time after the transmission period is longer than the limited fade time;

determining a second intermediate target value for controlling the parameter over the limited fade time; and
transmitting, via the communication circuit, the second intermediate target value.

19. The method of claim 18, further comprising:
waiting for a length of a second transmission period;
determining that the remaining fade time after the second transmission period is shorter than the limited fade time; and
transmitting, via the communication circuit, the target value of the parameter for controlling the electrical load and the remaining fade time.

20. The method of claim 17, further comprising:
calculating the intermediate target value for controlling the parameter based on a present value of the parameter and a lighting intensity adjustment value.

21. The method of claim 17, wherein the parameter is a parameter for controlling at least one lighting load, and wherein the parameter is selected from a group comprising a lighting intensity and a color temperature.

22. Non-transitory computer readable media having instructions stored thereon that, when executed by a control circuit, cause the control circuit to:
receive a target value of a parameter for controlling an electrical load and a fade time over which the parameter is to be controlled, the parameter to be controlled to the target value over the fade time at a constant fade rate;
determine that the fade time is longer than a limited fade time;
determine an intermediate target value for controlling the parameter over the limited fade time, wherein the intermediate target value is used to control the electrical load at the constant fade rate over the limited fade time; and
transmit, via a communication circuit, the intermediate target value for controlling the parameter over the limited fade time.

23. The non-transitory computer readable media of claim 22, wherein the intermediate target value is a first intermediate target value, and wherein the instructions, when executed by the control circuit, further cause the control circuit to:
wait for a length of a transmission period;
determine that a remaining fade time after the transmission period is longer than the limited fade time;
determine a second intermediate target value for controlling the parameter over the limited fade time; and
transmit, via the communication circuit, the second intermediate target value.

24. The non-transitory computer readable media of claim 23, wherein the instructions, when executed by the control circuit, further cause the control circuit to:
wait for a length of a second transmission period;
determine that the remaining fade time after the second transmission period is shorter than the limited fade time; and
transmit, via the communication circuit, the target value of the parameter for controlling the electrical load and the remaining fade time.

25. The non-transitory computer readable media of claim 22, wherein the instructions, when executed by the control circuit, further cause the control circuit to:
calculate the intermediate target value for controlling the parameter based on a present value of the parameter and a lighting intensity adjustment value.

26. The non-transitory computer readable media of claim 22, wherein the parameter is a parameter for controlling at least one lighting load, and wherein the parameter is selected from a group comprising a lighting intensity and a color temperature.

* * * * *